(12) United States Patent  
Stechmann

(10) Patent No.: US 10,808,883 B2  
(45) Date of Patent: Oct. 20, 2020

(54) BRACKET FOR MAGNETICALLY MOUNTING HARDWARE TO A STRUCTURE

(71) Applicant: Eric Stechmann, Liberty, MO (US)

(72) Inventor: Eric Stechmann, Liberty, MO (US)

( * ) Notice: Subject to any disclaimer, the term of this patent is extended or adjusted under 35 U.S.C. 154(b) by 482 days.

(21) Appl. No.: 15/437,000

(22) Filed: Feb. 20, 2017

(65) Prior Publication Data

US 2017/0159880 A1 Jun. 8, 2017

Related U.S. Application Data

(63) Continuation-in-part of application No. 15/009,398, filed on Jan. 28, 2016, now Pat. No. 9,577,417, which is a continuation-in-part of application No. 14/252,629, filed on Apr. 14, 2014, now Pat. No. 9,252,581.

(60) Provisional application No. 61/811,424, filed on Apr. 12, 2013.

(51) Int. Cl.
| | |
|---|---|
| *F16L 3/00* | (2006.01) |
| *H02G 3/32* | (2006.01) |
| *F16M 13/02* | (2006.01) |
| *F16B 1/00* | (2006.01) |
| *H02G 3/04* | (2006.01) |
| *H02G 3/30* | (2006.01) |
| *F21V 21/096* | (2006.01) |

(52) U.S. Cl.
CPC .............. *F16M 13/022* (2013.01); *F16B 1/00* (2013.01); *H02G 3/0456* (2013.01); *H02G 3/30* (2013.01); *F16B 2001/0035* (2013.01); *F16L 3/00* (2013.01); *F21V 21/096* (2013.01); *H02G 3/305* (2013.01)

(58) Field of Classification Search
CPC .......... F16M 13/022; F16M 3/00; F16B 1/00; F16B 2001/0035; H02G 3/0456; H02G 3/30; H02G 3/05; F21V 21/096; F16L 3/00

See application file for complete search history.

(56) References Cited

U.S. PATENT DOCUMENTS

| | | | | |
|---|---|---|---|---|
| 3,518,884 | A | * | 7/1970 | Wood, Jr. ................. G01K 1/14 374/189 |
| 4,613,847 | A | * | 9/1986 | Scolari ..................... B60Q 7/00 116/63 C |
| 4,907,769 | A | * | 3/1990 | Hunley, Jr. ............. F21V 21/06 248/122.1 |
| 5,623,801 | A | | 4/1997 | Drumbl |
| 5,699,910 | A | | 12/1997 | Kubat |
| 6,250,681 | B1 | * | 6/2001 | Takahashi ............... B60R 22/28 280/801.2 |
| 6,622,976 | B1 | | 9/2003 | Ianello |
| 6,945,735 | B1 | * | 9/2005 | Doverspike ............... F16L 1/09 248/207 |
| 7,354,360 | B1 | | 4/2008 | Eckstein |
| 7,624,957 | B2 | | 12/2009 | Klein |
| 8,235,235 | B1 | | 8/2012 | Lusch |

(Continued)

*Primary Examiner* — Tan Le  
(74) *Attorney, Agent, or Firm* — Lathrop GPM, LLP

(57) ABSTRACT

Disclosed herein is a bracket mounting system for magnetically securing hardware to a surface of a structure. The bracket mounting system includes at least one outwardly extending leg per side. Magnetic pads are secured to the distal ends of the legs and conform to the topography of the structure to maximize surficial contact.

15 Claims, 24 Drawing Sheets

(56) References Cited

U.S. PATENT DOCUMENTS

| | | | |
|---|---|---|---|
| 8,413,734 B2 | 4/2013 | Silcox et al. | |
| 8,439,316 B2 | 5/2013 | Feige | |
| 8,523,120 B2 * | 9/2013 | Asano | F16L 3/2235 |
| | | | 248/637 |
| 9,004,422 B2 * | 4/2015 | Feenstra | A62C 35/68 |
| | | | 248/200.1 |
| 9,188,276 B2 | 11/2015 | Klein | |
| 9,889,327 B2 * | 2/2018 | Mitchell | F16L 3/1075 |

* cited by examiner

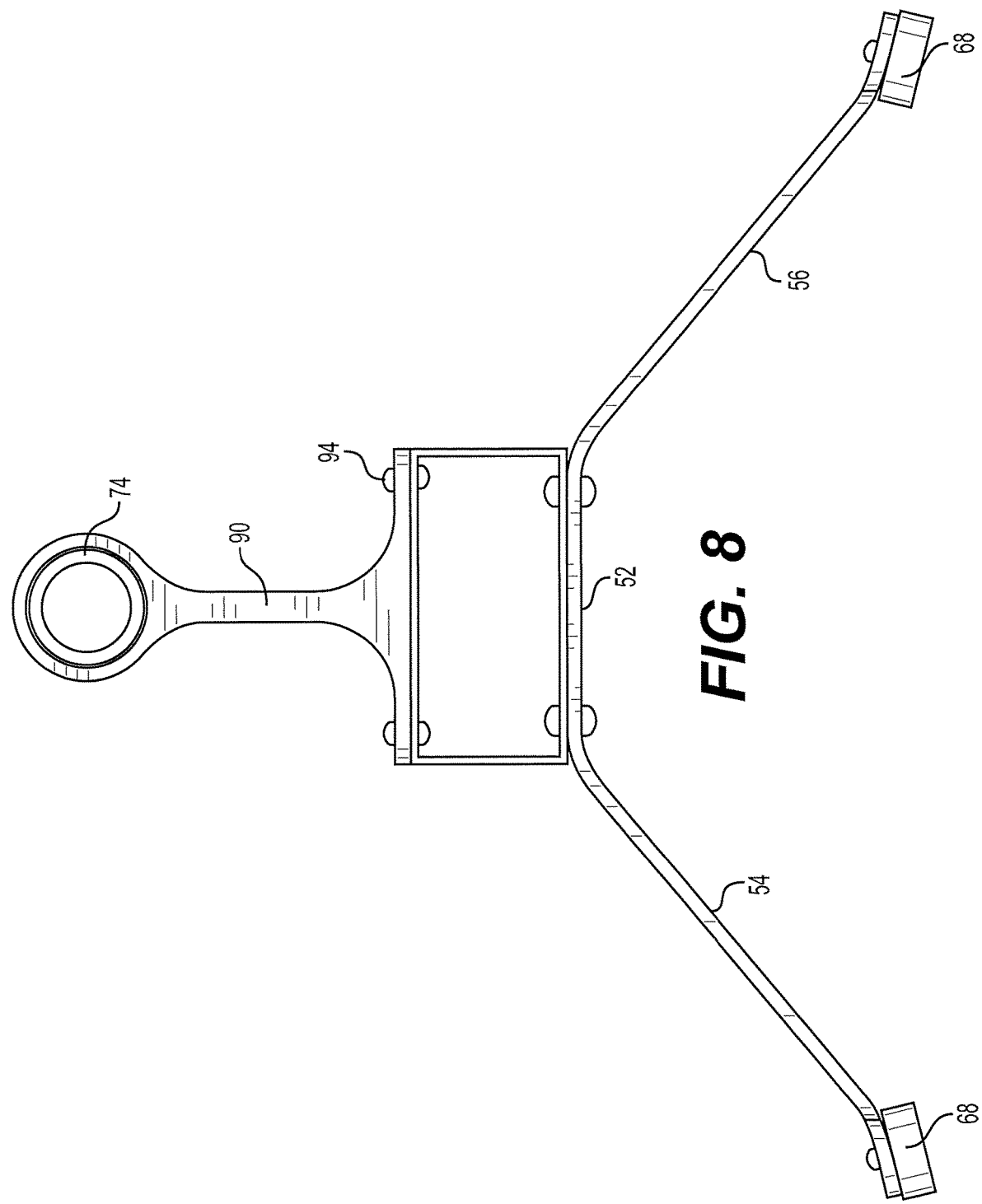

BRACKET FOR MAGNETICALLY MOUNTING HARDWARE TO A STRUCTURE

RELATED APPLICATION

This application is a continuation-in-part to U.S. application Ser. No. 15/009,398 filed on Jan. 28, 2016 which is a continuation-in-part of U.S. application Ser. No. 14/252,629 filed on Apr. 4, 2014 which claims priority from U.S. Provisional Application No. 61/811,424 filed Apr. 12, 2013.

FIELD OF THE DISCLOSURE

This disclosure relates to brackets and magnetic mounting systems. More specifically, this disclosure concerns brackets and mounting systems for securing hardware to structures in a wide range of orientations with surfaces comprised of ferromagnetic material without the need to penetrate or weld to the surface of the structure.

BACKGROUND

Historically, equipment from communication and electrical installations including; coaxial cables, conduit, wires, and other components which vertically traverse elevated structures have been fastened directly to worker access structures including; ladders, ladder cages, and hand rails. These structures have provided an immediate solution for equipment fastening. However, this type of installation has historically presented unsafe working conditions for the workers by obstructing and encumbering movement and rescue throughout access areas. Additionally, these installations may cause maintenance and/or structural damage when installed on areas which lack initial design and structural capability. Aside from fastening communication devices onto the aforementioned areas, a commonly employed installation technique includes welding or banding of communication brackets and raceways along the length of vertical steel. Many of these installations, however, have historically been of high cost and are associated with additional safety, structural, and maintenance issues.

The United States Occupational Safety and Health Administration's (OSHA) current regulations stipulate against specific obstructive encumbrances upon or within worker or rescuer access areas. Other national U.S. and state agencies also provide regulatory and design stipulations further prohibiting obstructions into and within these areas. More specifically, traditional fastening of communication and electrical equipment onto areas such as ladders encumber the fluid motion of the workers' hands when grasping and transitioning along the side-rails. Fastening devices such as clamps and bolted connections commonly encumber foot placement on rungs and further create abrasion risks for the worker or rescuer. Many coaxial cables used in the telecommunication industry emit radio-frequency waves. When workers and rescuers are subjected to these close-proximity coaxial cable installations they face exposure to radio-frequency waves which are known to cause bodily harm.

Elevated steel structures and associated access structures are commonly coated with expensive corrosion resistant high performance materials in order to limit corrosion through environmental exposure to the steel. Many of these materials need to be maintained according to industry standards derived from the Society for Protective Coatings, the National Association of Corrosion Engineers, and the American Water Works Association. When scheduled for routine maintenance and renovation work, many of the aforementioned traditional fastening methods are difficult to temporarily move off of or away from the steel. In some cases coordination of a temporary removal of the communication equipment may allow for a non-obstructed steel structure during its time of maintenance. Many of these cables and antennae are temporarily re-erected onto a Cell-On-Wheels (C.O.W.) which is usually an expensive and logistically difficult scenario. Due to the cost of the telecommunication equipment and ownership, many steel structure maintenance providers are prohibited from removing or repositioning such equipment. It is common for this telecommunication equipment to remain fastened to the coated steel surface, presenting a surface preparation and coating obstruction. This, in turn, causes the obstructed steel areas to not receive the proper corrosion repair and application of coatings. Furthermore, many installations induce abrasion and corrosion to the steel structure through cyclic abrasive action between coatings and fastening connections and by increasing the moisture content below and adjacent to the fastening area.

A traditional method of fastening communications equipment away from access areas includes weld-fastening coated steel stand-off brackets in series along the structural steel body. The cables can then be secured to these firmly welded "stand-off" brackets. Welding steel brackets onto the structure, especially an existing structure, is usually expensive, time intensive, requires specialized equipment and certification. In the case of weld-fasting onto a coated steel structures, the installation procedure must include abrasive removal of the coatings and steel in the areas of welding. This creates a breach in the homogenous corrosion resistance application to the steel which may cause accelerated corrosion if left improperly repair coated. Additionally, high temperatures induced from welding and grinding typically cause burning of the coatings near the site of the weld and obverse to the steel weld area. Proper repair of these areas include grinding of all affected areas to fresh steel and re-application of one or multiple coating layers which must also be matched for color and chemical compatibility. Traditionally, the obverse side of many of these installations are left inadequately or completely devoid of proper repair.

Steel surfaces to which fastening must be accomplished between communication equipment and the steel surfaces vary greatly according to radii and angled corners. While welded "stand-off" brackets come in a variety of shapes and sizes, they are not specifically designed to tangentially surface match with these curves and angles of the underlying steel structure. Thus, these existing one-size-fits-all brackets do not maximize the surficial contact areas in order to provide the maximum amount of application stability. Previous designs also create sharp contact areas which regularly cause sharp abrasion pinch-points to underlying coatings. Additionally, these installations are not low-profile when compared to the steel surface, creating obstructions within the cross-section of access areas. This existing high-profile issue causes a top-heavy high profile connection which may structurally fail when induced to seasonal external environmental forces such as wind and ice dynamic loading characteristic of elevated structures.

SUMMARY OF THE INVENTION

The present disclosed technology consists of a bracket, as well as an improved mounting system for securing components to a structure with at least a portion of the surface comprised of ferromagnetic material. In a first embodiment the bracket is comprised of a plurality of individual brackets each of which has at least two legs, and preferably a plurality of legs, which are angled in order to tangentially match the radius or angle of the structure to which the bracket is applied. Secured to each of the legs is a magnetic pad that serves to adhere each of the individual brackets and in turn the entire integrated bracket to the structure. The curved, and in some cases hinged configuration of the legs allows for increased surficial contact area between the magnetic pad at the distal end and the surface of the structure. The integrated bracket utilizes a box tube member spanning and connecting the entire collection of individual brackets. A tube is mounted, by various means, atop the box tube member and the tube is used to attach, for example, antenna structures, banners or lighting that may need to be secured to the structure.

In a second bracket embodiment, a monolithic bracket has at least two angled legs and at least one magnetic pad attached to the distal end of each leg of the bracket. The monolithic bracket, in contrast to the integrated bracket, does not rely upon a plurality of underlying individual brackets but utilizes a single panel of steel to form the desired shape of the bracket that is secured to the structure.

In a third bracket embodiment, a longitudinally extending panel member comprised of an upper surface, a lower surface, oppositely disposed ends, first and second rail members and at least one longitudinally extending channel between the rail members as well as at least one magnetic pad mounted to each of the oppositely disposed panel ends. The bracket further comprises at least one clamp set. The clamp set further comprises first and second clamp members, each clamp member having an upper end and a lower end, the upper end of the first clamp secured to the upper end of the second clamp. The lower ends of the first and second clamp members are inserted into the channel and retained in position by the first and second rail members. In a use configuration the clamp secures to the panel member hardware, such as a conduit, extending through the clamp set.

Various objects, features, aspects and advantages of the disclosed subject matter will become more apparent from the following detailed description of preferred embodiments, along with the accompanying drawings in which like numerals represent like components. The contents of this summary section are provided only as a simplified introduction to the disclosure, and are not intended to be used to limit the scope of the appended claims.

The contents of this summary section are provided only as a simplified introduction to the disclosure, and are not intended to be used to limit the scope of the appended claims.

BRIEF DESCRIPTION OF THE DRAWINGS

FIG. 8 is an elevation view of an embodiment of the bracket revealing an individual bracket, box tube and tube member;

DEFINITIONS

As used herein the following terms have the following meanings:

The term "distal end" shall mean the end of the bracket leg that is most distant from the center connecting member, channel or panel of the bracket.

The term "radius of curvature" shall mean the radius of a circle that best fits the curve at that point on the structure.

The term "angle of departure" shall mean the angle of incline or decline from which the leg members of a bracket extends away from the center panel of the bracket.

DETAILED DESCRIPTION

The disclosed technology is directed to a bracket that is curved so that the curvature of the distal end of the legs is matched to the tangential radius or angle of the structure, such as a water tower, that the bracket will be secured to. The surface of the structure can be concave, convex, or form any number of angles.

Figure 1:
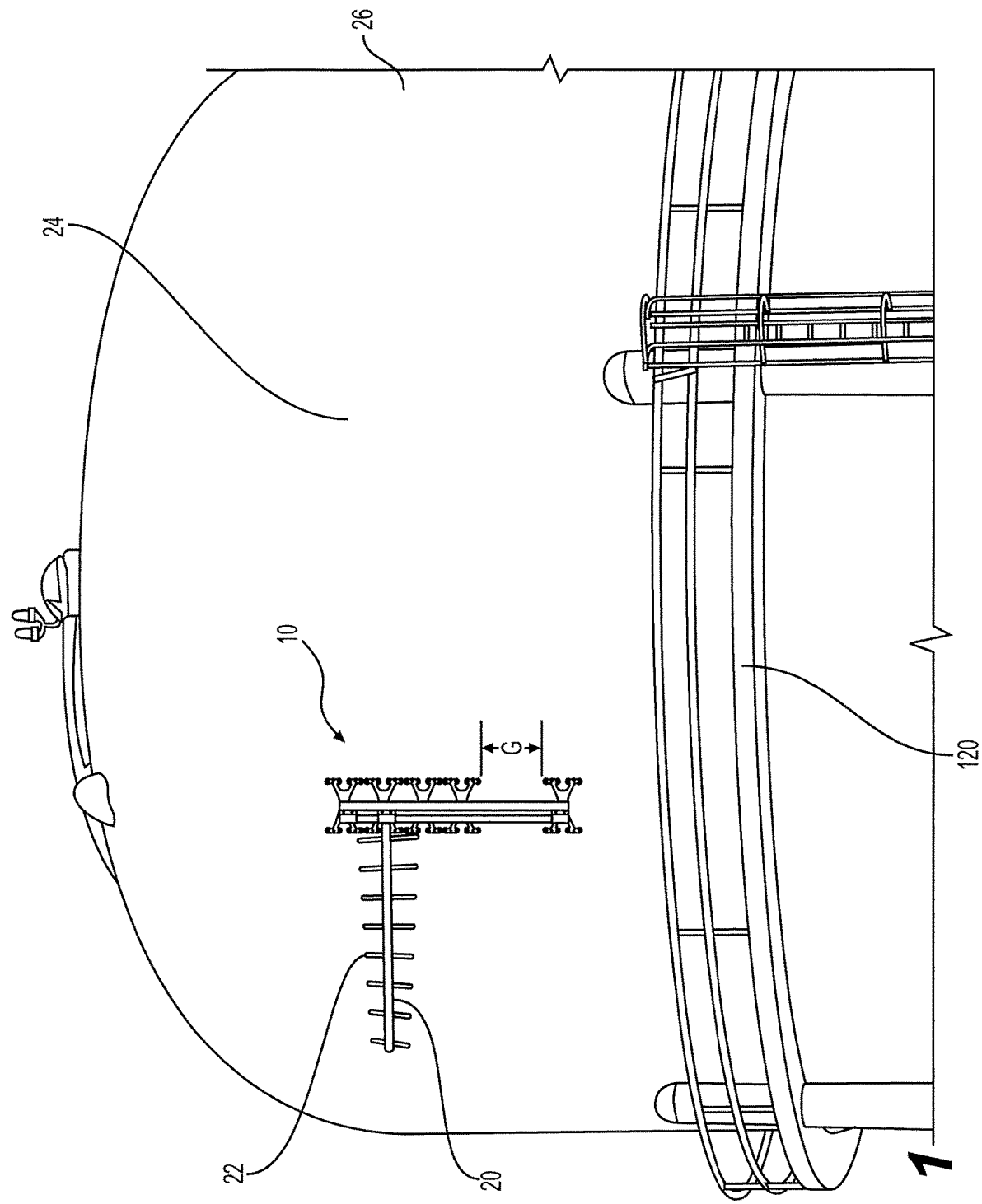
FIG. 1 is a perspective view of an embodiment of the bracket secured to the surface of a water tower structure.
Figure 2:
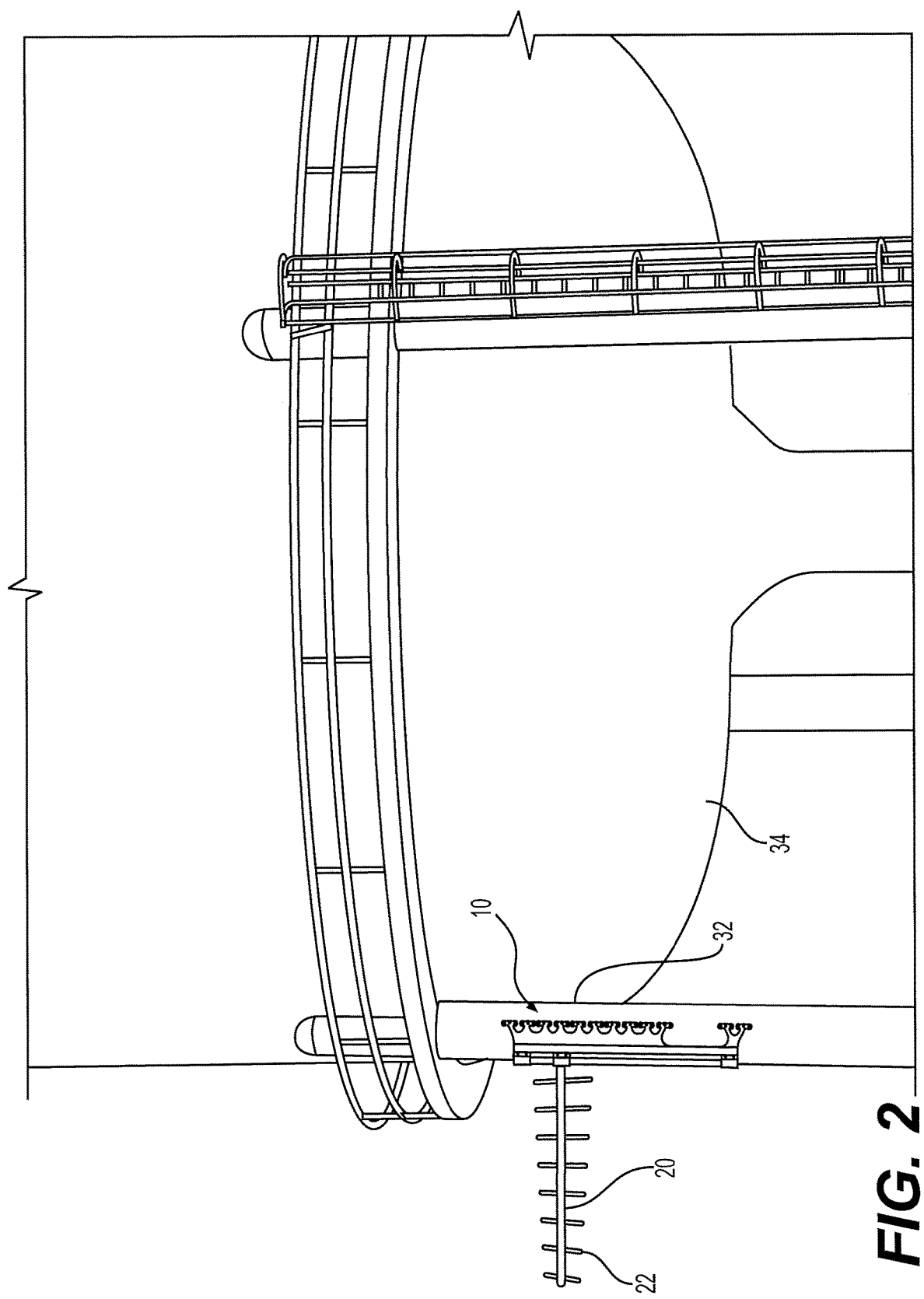
FIG. 2 is a perspective view of an embodiment of the bracket secured to a leg of a water tower structure.

As shown at FIG. 1, the disclosed apparatus is a bracket and system 10 for securing hardware 20 to a surface 24 of a structure 26 with a radius of curvature. The bracket 10 is utilized, for example, for attachment to water towers or any other ferrous metal structure without the need to penetrate the shell 28 of the structure 26 or weld to the surface or shell of the structure or remove coatings applied to the surface of the structure 26. As shown in FIG. 1 the bracket 10, utilizing its magnetic components which will be discussed in greater detail below, may be applied to the exterior surface 24, or shell, of a water tower, or any ferromagnetic structure, for use in solidly, yet removably securing hardware 20, such as a directional antenna 22, to the surface of the tower. FIG. 2 reveals an embodiment of the bracket 10 secured to the leg 32 of a water tower 34. The choice of whether to secure the bracket 10 and associated hardware 20 to the surface shell 24 of a water tower 34, as shown in FIG. 1 or to the leg 32 of a water tower 34, as shown in FIG. 2, is dependent upon a number of factors including the sensitivity of the hardware 20 to the location on the tower, cabling restrictions and possibly even aesthetic considerations that are dictated by the surrounding community or possibly even local ordinances.

The magnetic attachment mechanism facilitates attachment of the hardware to the structure and importantly avoids removal of very costly coatings or welding to the water tower 34 which could result in potential contamination of the water supply, weakening of the shell material or the formation of leaks that may be extremely difficult to control.

Figure 4:
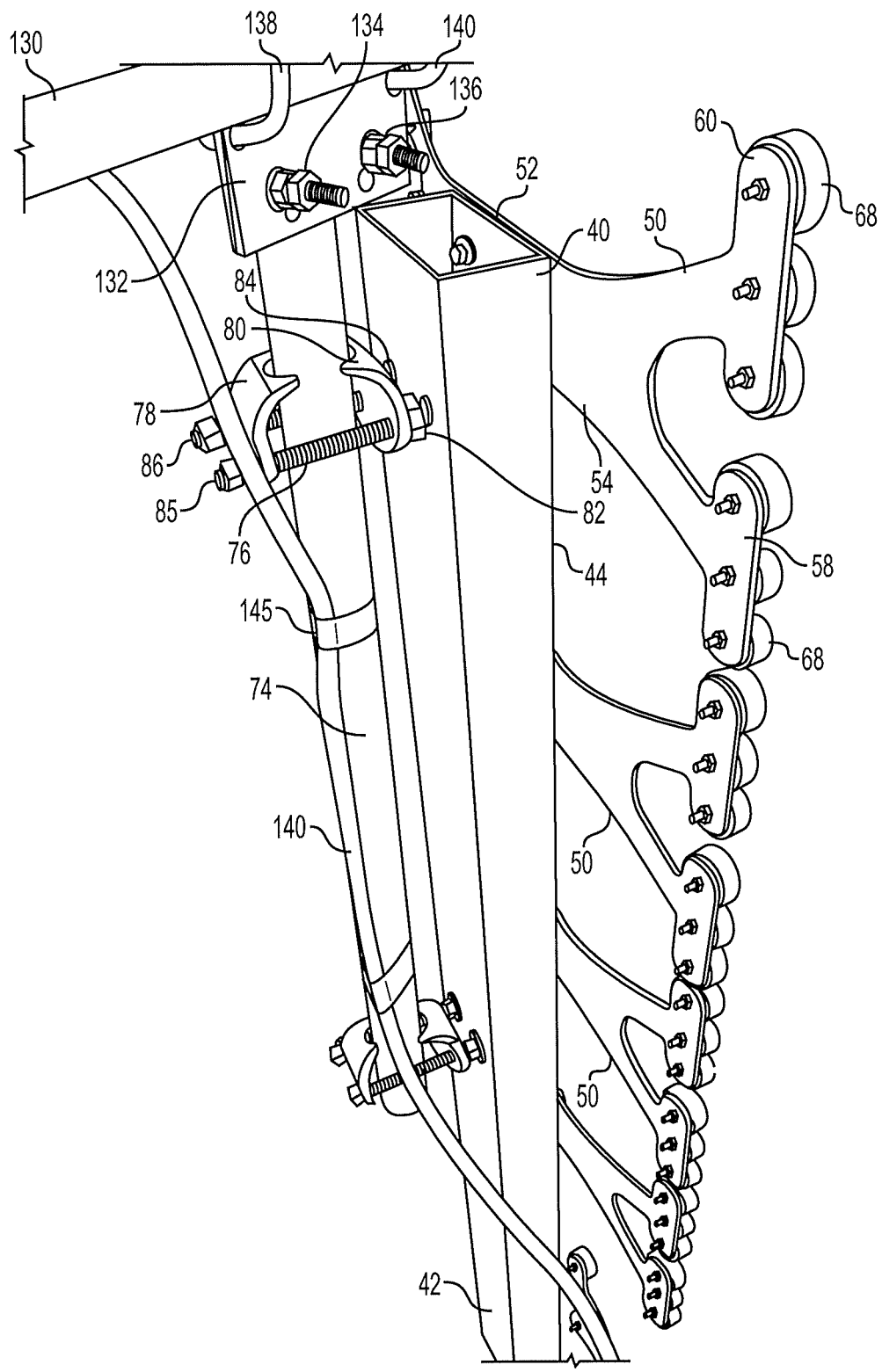
FIG. 4 is a perspective view of an embodiment of the bracket with a box tube and a tube member for securing an antenna to the bracket.

An embodiment of the disclosed bracket 10 is shown in FIG. 4 and details a longitudinally extending box tube 40 with an upper surface 42 and a lower surface 44. The box tube 40 may be fabricated from many materials such as steel, aluminum or even engineered plastics; however, a preferred embodiment of the box tube is fabricated from aluminum due to the metal's light weight, material strength and resistance to extreme environments including weathering, intense direct sunlight and deposition of airborne pollutants that can be corrosive. Although the dimensions of the box tube 40 may vary substantially depending upon the size and weight of the hardware 20 to be supported on the structure 26, a preferred embodiment and one that is generally appropriate for most applications is the use an aluminum box tube that is two inches in height by four inches in width with a wall thickness of 3/16 of an inch. Numerous alternative dimensional configurations of a box tube 40 may be employed in order to satisfy the specific demands of the application.

Figure 3:
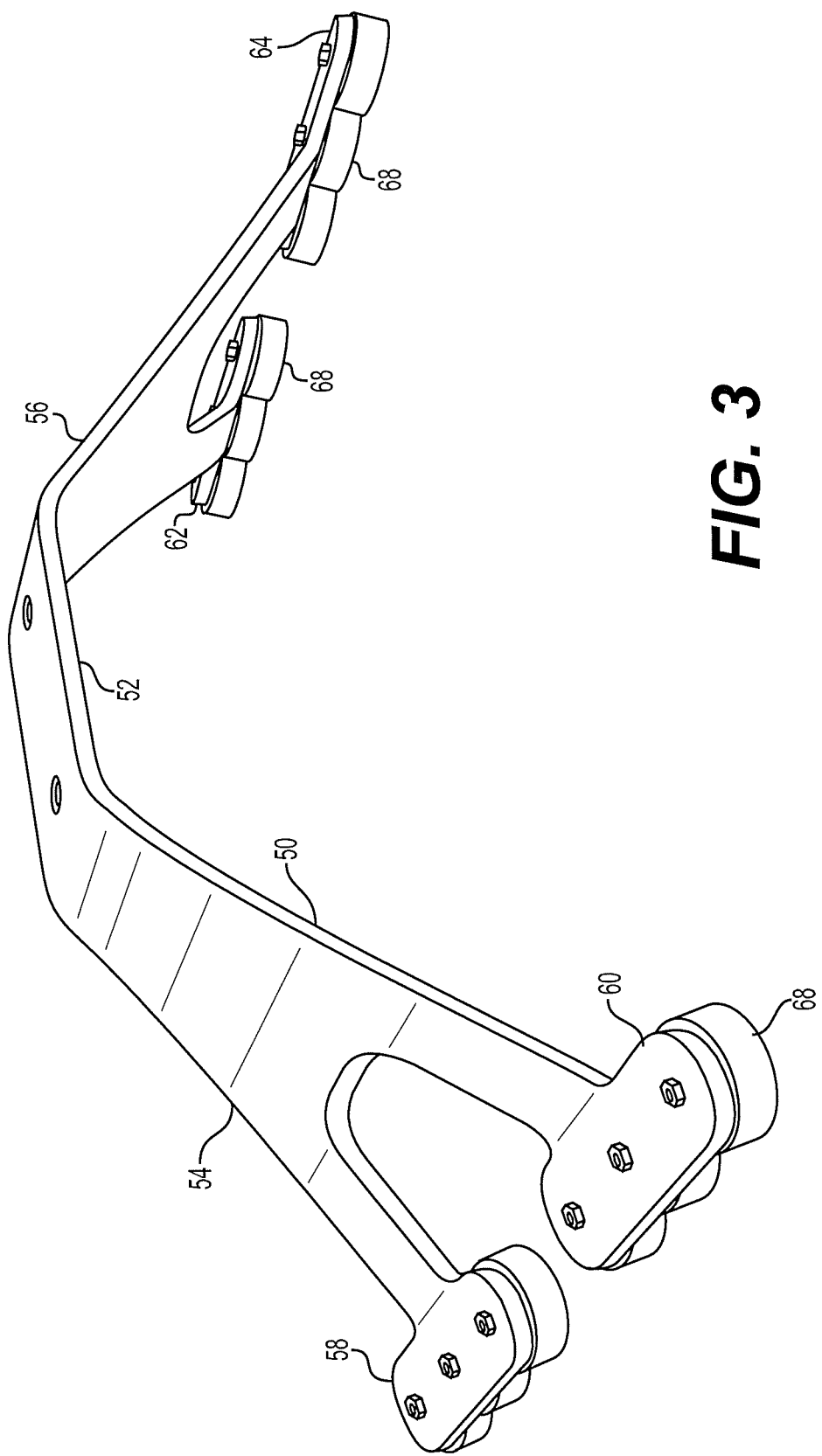
FIG. 3 is a perspective view of an embodiment of an individual bracket.

FIG. 4 details that secured to the lower surface 44 of the box tube are individualized brackets 50 as shown in FIG. 3. A preferred configuration for the brackets 50 includes a flat central panel 52 that is disposed against the lower surface of the box tube 40 and is secured in position with threaded fasteners, rivets or even an all-weather adhesive. Extending outwardly from each side of the central panel 52 are legs 54, 56. Each of the legs 54, 56 legs extends outwardly terminating in one or more distal ends 58, 60, 62, 64. FIG. 3 reveals that the legs 54, 56 may be bent away from the central panel 52 to align the distal ends with the surface contour of the structure 26 to which the bracket 10 is to be attached. A greater or lesser number of distal ends may be employed on each individualized bracket 50 depending upon the specific demands of the application being undertaken.

FIG. 3 details that one or more magnetic pads 68 are secured to the distal ends 58, 60, 62, 64 of each of the at least two legs 54, 56, wherein due to the bend in the legs the surficial contact of each magnetic pad 68 with the surface of the structure is maximized. In order to maximize the holding power of the magnetic pads 68, the surface contact between the magnetic pad and the surface of the structure must be increased to the greatest extent possible. The magnetic pads 68 are preferably comprised of neodymium magnets because these magnets generally have the greatest magnetic field strength per weight ratio of permanent magnets currently and commonly available. Alternatively, magnets comprising varying compositions and magnetic strengths may also be utilized. The distal ends 58, 60, 62, 64 of the legs may be capable of accommodating one or more magnetic pads 68. The embodiment detailed in FIG. 3 reveals distal ends capable of accommodating six magnetic pads 68 per side of the individualized brackets 50. The opposite side of the individualized bracket 50 preferably employs an equal number of magnetic pads to ensure the evenly distributed holding power of the magnetic pads.

One or more individualized brackets 50, as shown in FIG. 4, are secured to the lower surface 44 of the box tube 40. Additional individualized brackets 50 secured to the box tube increase the holding power of the bracket 10. A greater number of individualized brackets 50 are employed as the weight of the hardware 20 mounted to the structure increases. In order to reduce weight and only nominally adversely impact the holding power of the bracket 10, a gap "G" between an upper grouping of individualized brackets and a lower bracket may be utilized as can be seen in FIG. 1. Importantly, the concentration of individualized brackets 50 must occur at the upper end of the bracket as it is secured to the structure in order to manage the moment arm applied to the bracket 10 that seeks to peel the bracket 10 from the structure 26 once the hardware 20, e.g., directional antenna 22, is mounted to the bracket 10.

FIG. 4 details a tube member 74 mounted to the upper surface 42 of the box tube 40. The tube member 74 in a first configuration is secured to the box tube 40 with mounting hardware comprising threaded fasteners 76 sunk into the upper surface 42 of the box tube 40 and the use of upper and lower jaw clamps 78, 80 to bite into the tube member. The threaded fasteners 76 pass through and are secured to the upper surface 42 with the assistance of locking nuts 82, 84 and upper locking nuts 85, 86 secure the upper jaw clamp against the upper surface of the tube member 74.

Figure 5:
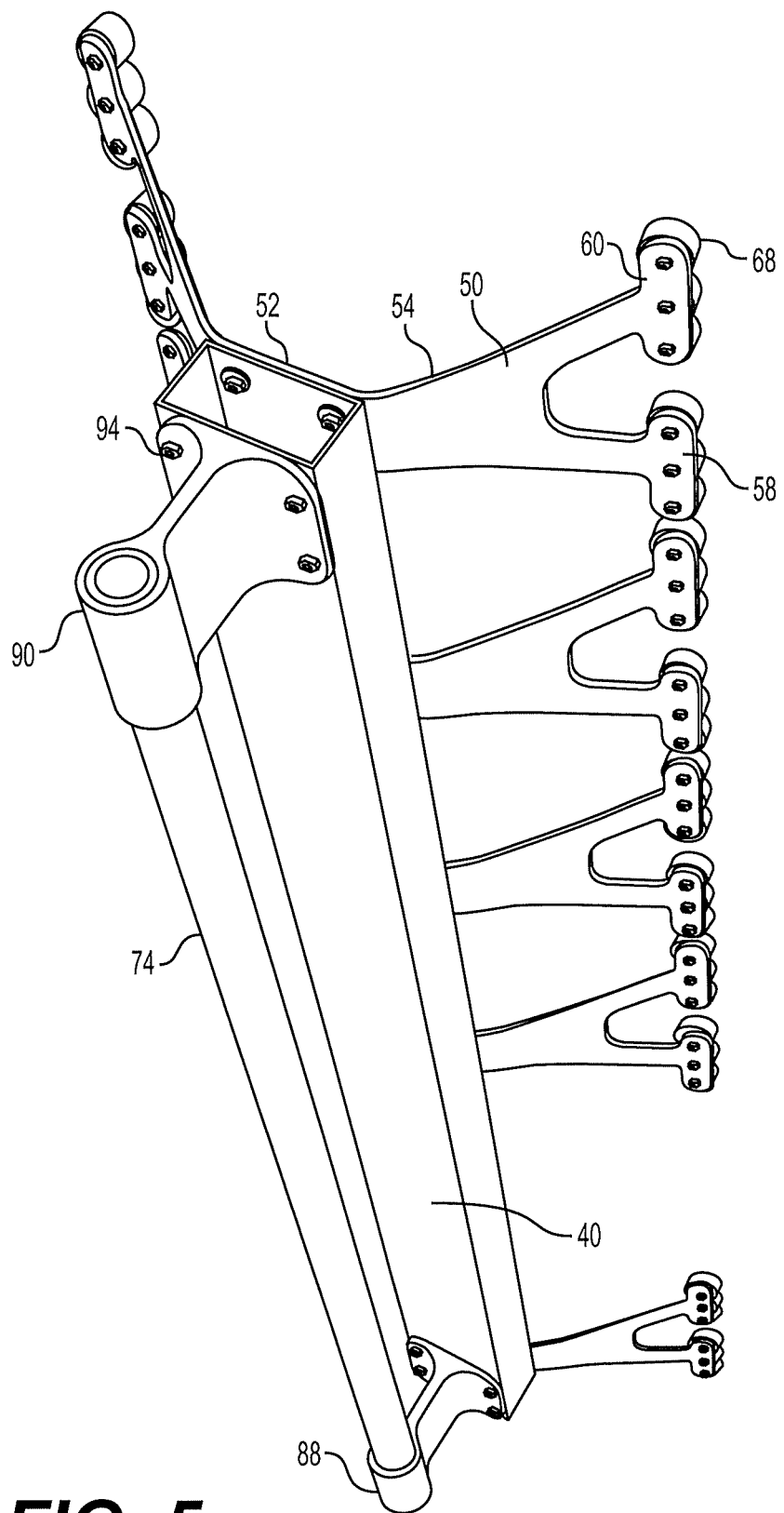
FIG. 5 is a perspective view of an embodiment of the bracket with the box tube in position atop the individual brackets and an alternative embodiment of the tube member mounted to the box tube.
Figure 6:
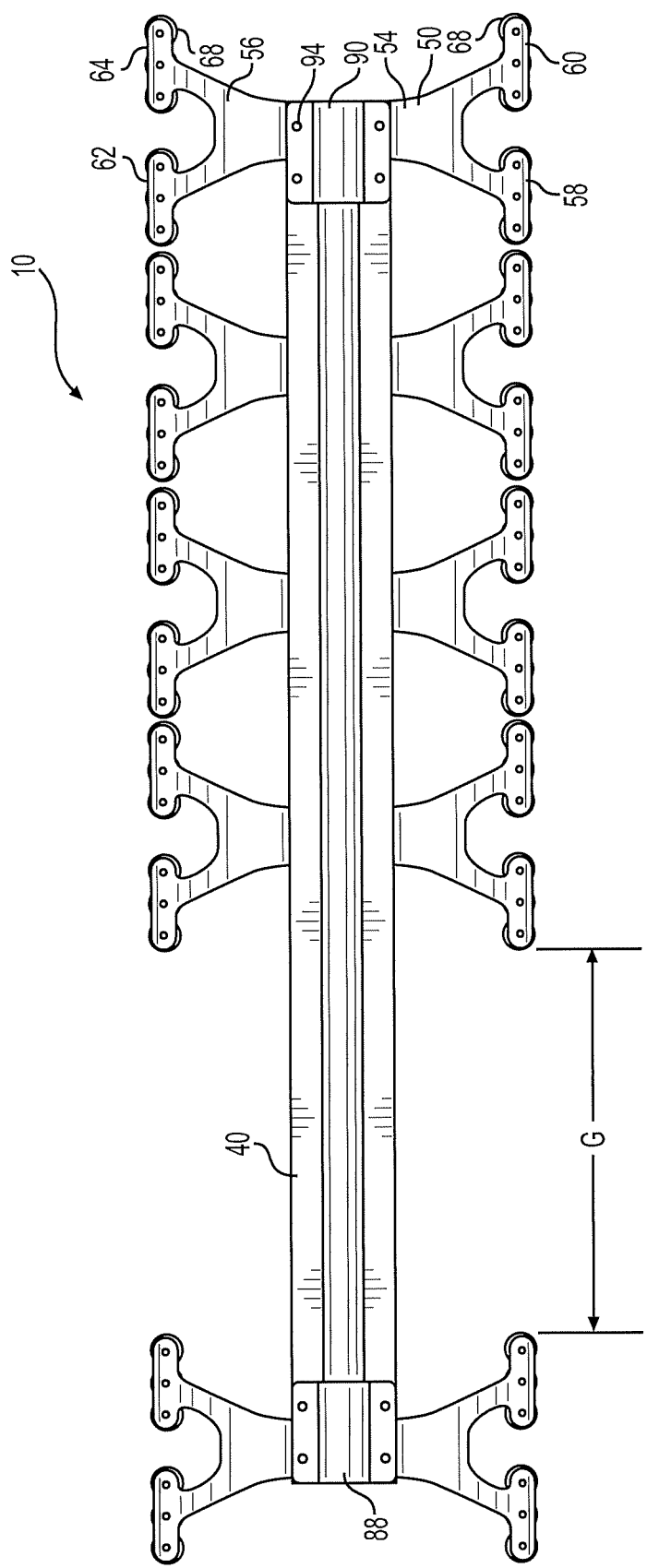
FIG. 6 is a plan view of an embodiment of the bracket.

An alternative embodiment for the tube member 74 is shown in FIG. 5. Two tube locks 88, 90 are secured to the upper surface 42 and opposite ends of the box tube 40 and maintain the tube member 74 in position atop the box tube 40. The tube locks 88, 90 are each secured to the box tube 40 with threaded fasteners 94 preventing movement of the tube member. FIG. 6 provides a plan view of the bracket 10 in assembled form using the tube locks 88, 90 depicted in FIG. 5. This view clearly details how separate individualized brackets 50 are assembled along and beneath the box tube 40 and that a gap "G" may exist between one or more individualized brackets without compromising the ability of the bracket to solidly secure the bracket to the structure 26.

Figure 7:
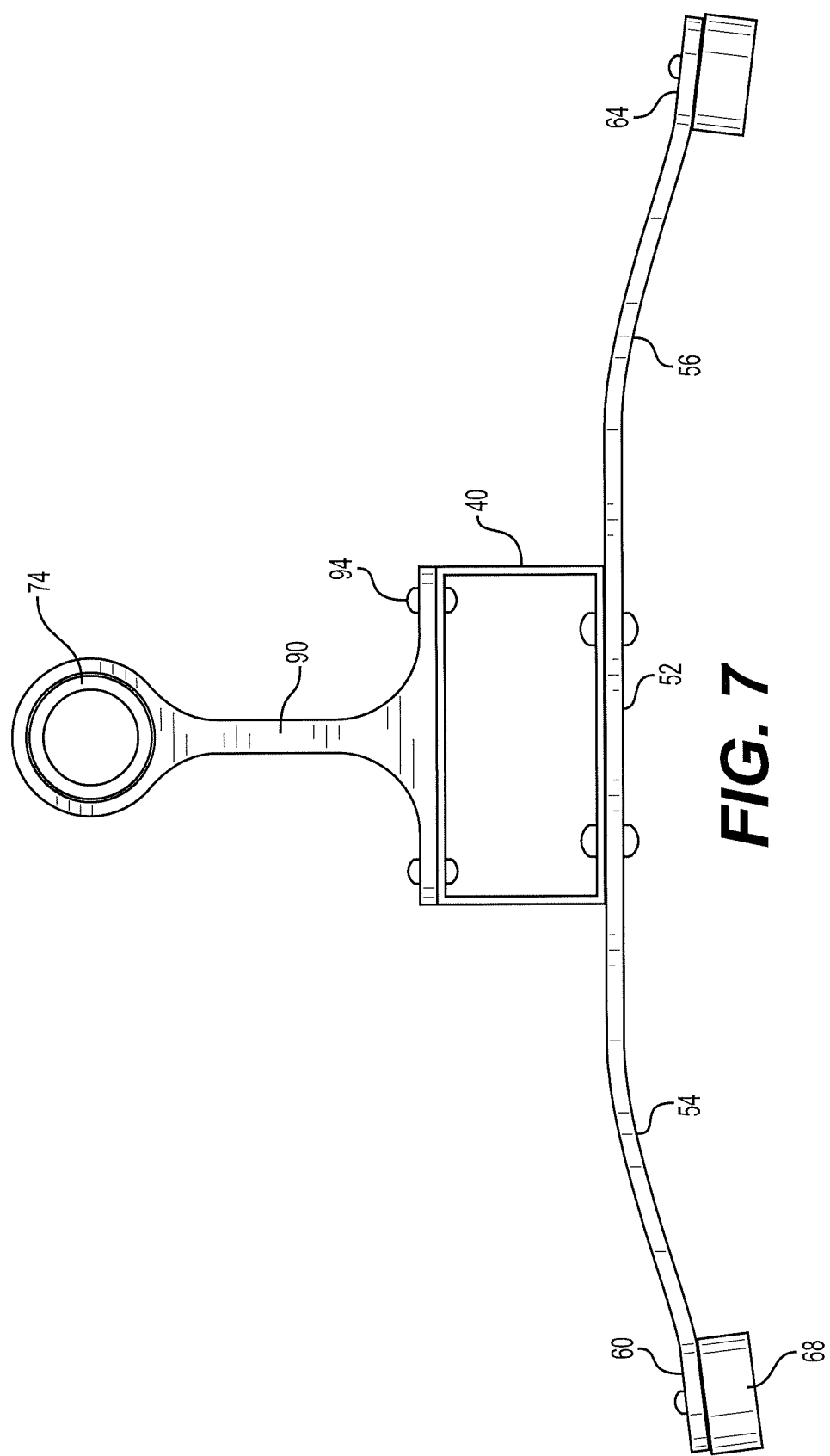
FIG. 7 is an elevation view of an embodiment of the bracket revealing an individual bracket, box tube and tube member.

FIG. 7 details an elevation view of an embodiment of a bracket 10 viewed from one end of the bracket. The view details the bend in the legs 54, 56 in order for the magnetic pads to match the curvature of structure to which the bracket is attached. FIG. 7 reveals a bracket with a nominal amount of bend to the legs 54, 56 while FIG. 8 reveals leg bends that are much more drastic with a greater angle of departure for the downwardly extending legs. This bracket embodiment being better suited for addressing a structure with a smaller radius.

Figure 7A:
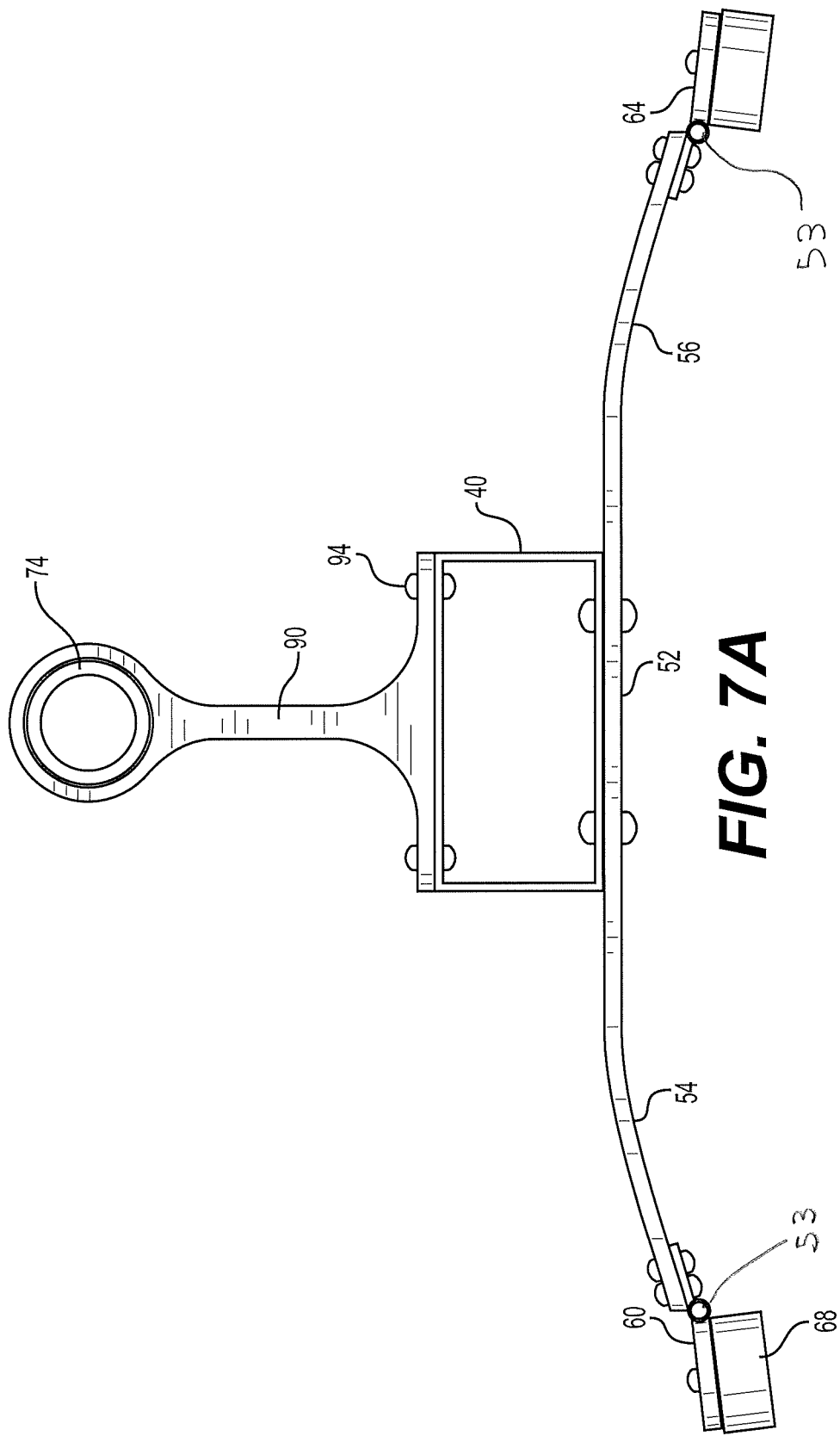
FIG. 7A is an elevation view of an embodiment of the bracket of FIG. 7 with hinge elements.

For illustration purposes the bend in the legs shown in FIG. 7 may be appropriate for the shell of a large diameter water tower 34 while the bend shown in FIG. 8 may be appropriate for the leg 32 of a water tower since the radius of curvature of the leg is far less than the shell of a large water tower. A low profile bracket is important with bracket design in that the moment arm seeking to peel the bracket from the structure due to the weight of the hardware is greater for brackets 10 that extend farther from the surface of the structure. Consequently, the brackets 10 can be fabricated as needed so as to increase the outward reach of the legs 54, 56. FIG. 7A reveals an embodiment of the bracket 10 with hinge elements 53 proximate the magnetic pads 68 at the distal ends 60, 64. The hinge elements 53 facilitate rotation of the magnetic pads 68 to maximize surficial contact with the surface of the structure. These hinge elements 53 may also be employed on other bracket 10 configurations and are shown in FIG. 7A purely for illustration purposes.

Figure 9:
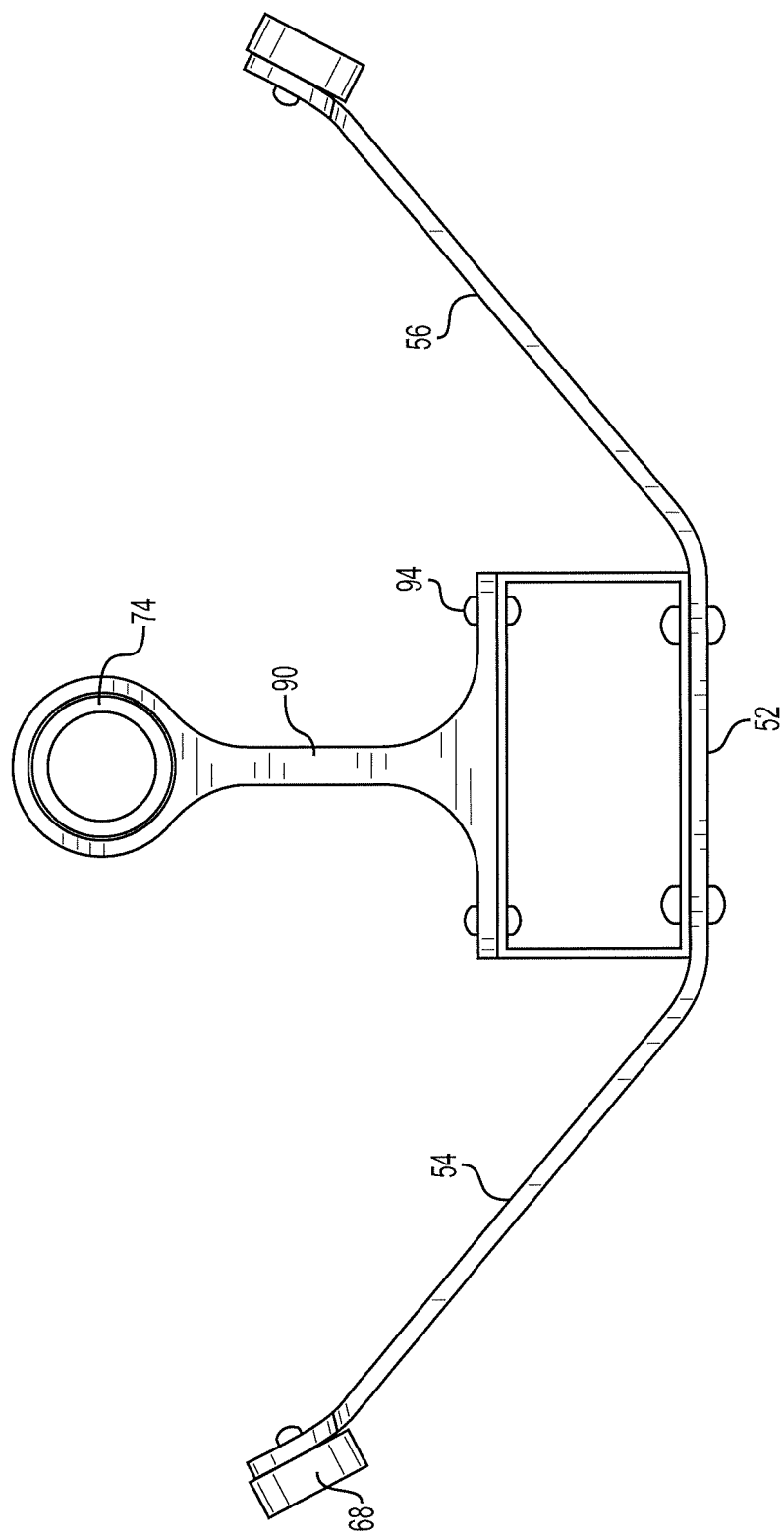
FIG. 9 is an elevation view of an embodiment of the bracket revealing an individual bracket, box tube and tube member.

FIG. 9 depicts a bracket 10 configuration suitable for a ribbed water tower also known as a fluted steel column. This type of structure utilizes vertically extending corrugations and the bracket configuration shown in FIG. 9 allows the upwardly bent legs 54, 56 to contact the corrugation sides of the ribbed water tower. This low profile design is highly practical and functional for fluted steel column designs and avoids the need to penetrate the corrugations or have unsightly brackets and mounting hardware extend outwardly from the main structure.

Figure 10:
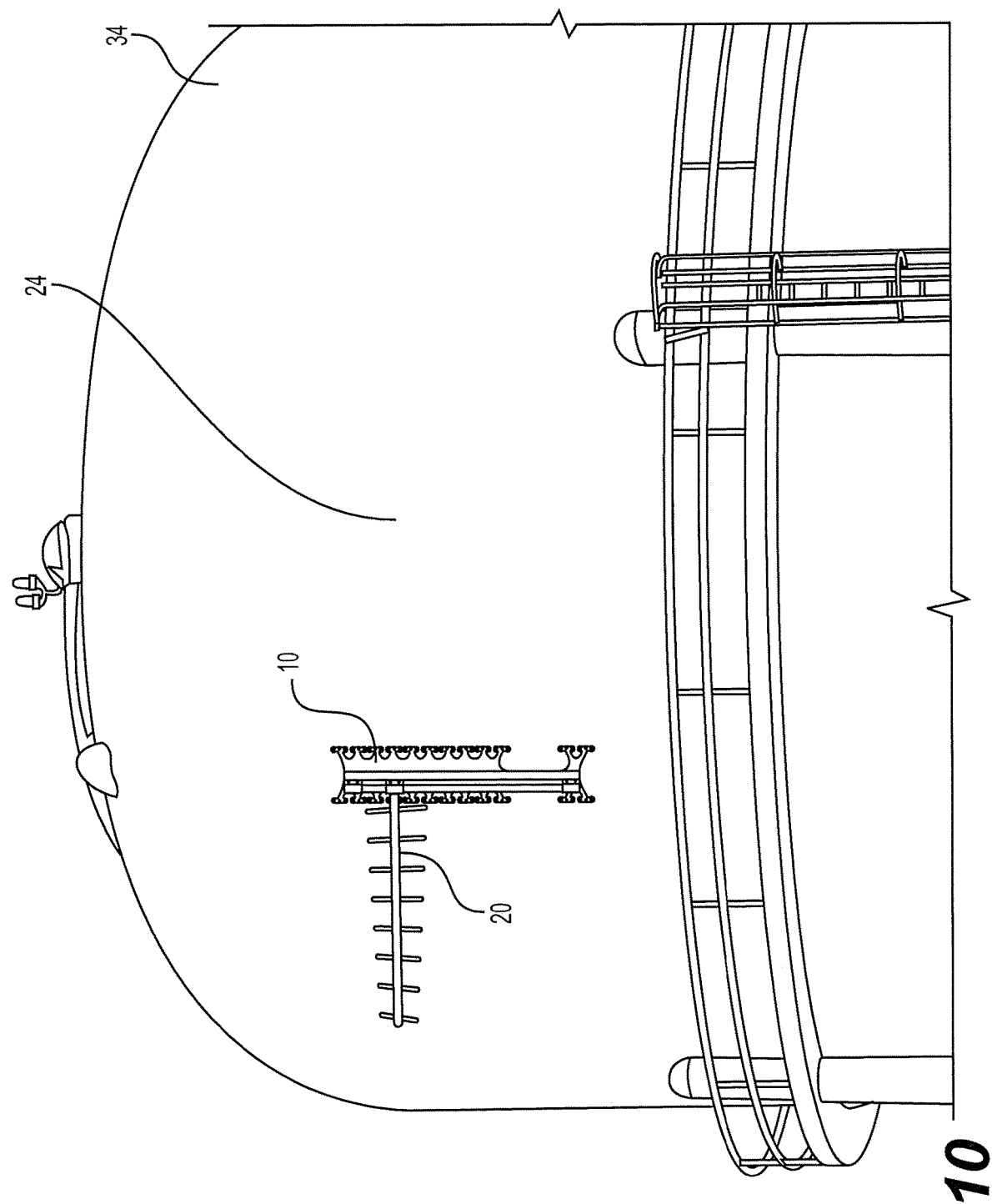
FIG. 10 is a perspective view of an embodiment of the bracket, and antenna mounted thereto, secured to the surface of a water tower structure.
Figure 11:
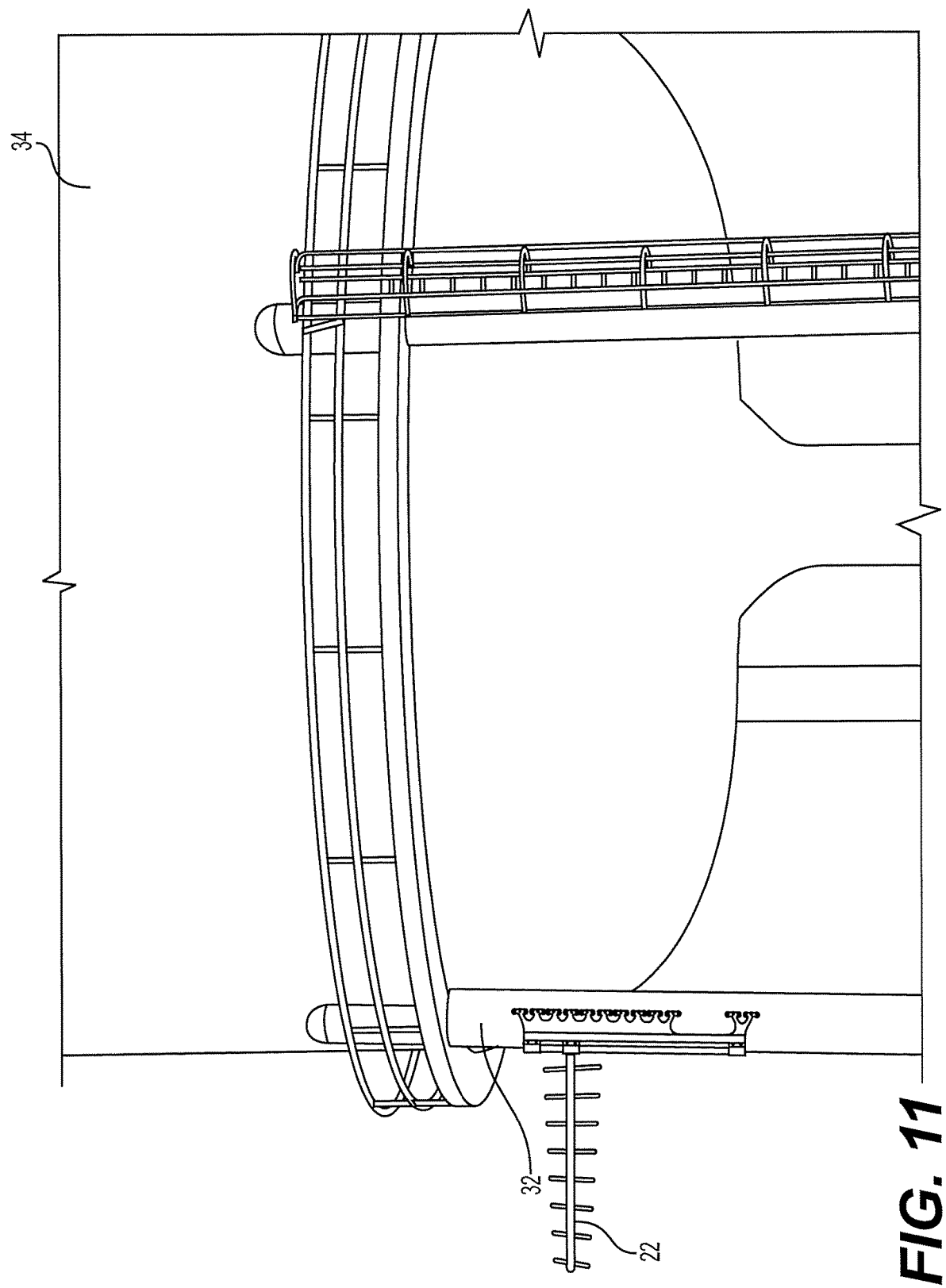
FIG. 11 is a perspective view of an embodiment of the bracket, and antenna mounted thereto, secured to a leg of a water tower structure.
Figure 12:
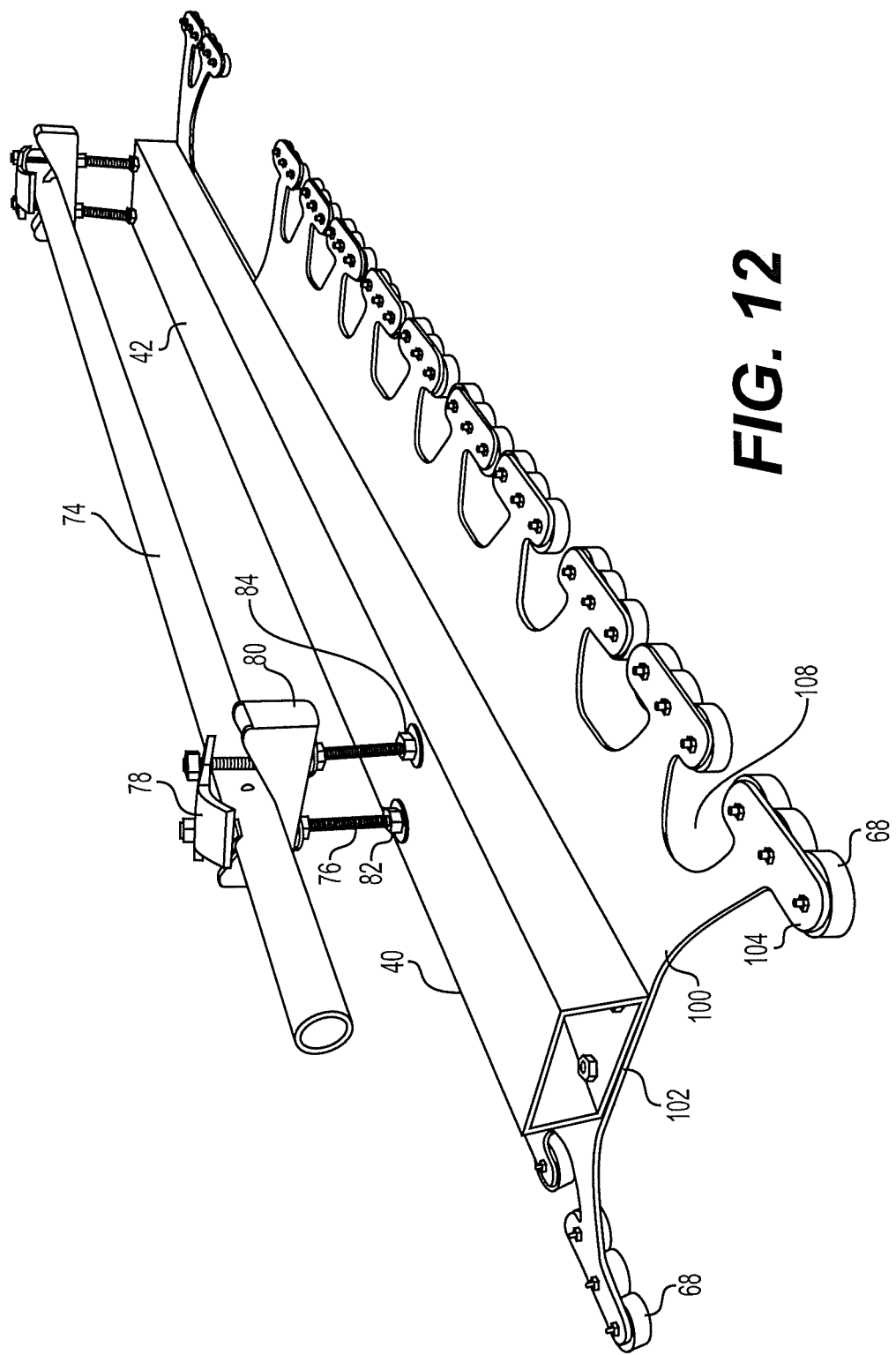
FIG. 12 is a perspective view of an embodiment of the bracket.

FIG. 10 reveals an alternative embodiment of the bracket 10 with associated hardware 20 in the form of a directional antenna 22 secured to the shell 24 of a water tower 34. FIG. 11 reveals the alternative embodiment of the bracket 10 secured to a leg 32 of a water tower 34 with a directional antenna secured thereto. FIG. 12 provides a more comprehensive view of the alternative embodiment of the bracket 10. As with the first embodiment, a box tube 40, preferably fabricated from aluminum, serves as the backbone of the bracket assembly.

This bracket 10 embodiment utilizes a monolithic leg set 100 preferably fabricated from a single blank of material. The monolithic leg set 100 is preferably fabricated from 10 gauge stainless, or galvanized, steel to provide sufficient rigidity and stiffness to prevent excessive bending of the bracket under loads that may increase significantly due to, for example, powerful gusts of wind. Alternatively, materials such as aluminum may be employed to create the leg elements of this embodiment of the bracket 10. The monolithic leg set 100 includes a flat central panel 102 that is secured to the lower surface 44 of the box tube utilizing appropriate attachment hardware that is well known in the art.

The monolithic leg set 100 includes distal elements 104 onto which magnetic pads 68 are attached using threaded fasteners, rivets or an adhesive. The magnetic pads 68, as discussed above, are preferably comprised of neodymium magnets because these magnets generally have the greatest magnetic field strength per weight ratio of permanent magnets currently and commonly available. Alternatively, magnets comprising varying compositions and magnetic strengths may also be utilized. The distal elements 104 and associated magnetic pads 68 are preferably separated from one another by cutouts 108 in the monolithic leg set 100. The cutouts 108 are instrumental in reducing the weight of the bracket 10 thereby reducing the effort required to initially position the bracket 10 against the structure 26.

As with the previous embodiment, the functionality of this embodiment relies heavily upon the bent nature of the monolithic leg set 100 extending outwardly from both sides of the flat central panel 102 thereby allowing the associated magnetic pads 68 to maximize contact with the surface of the structure. For all embodiments of the bracket 10, the legs are custom bent to maximize the surficial contact between the magnetic pads 68 at the distal elements 104 of the leg set 100 and the surface of the structure to which the bracket 10 is to be secured. A low profile is also preferred for this embodiment. A low profile enhances the ability of the bracket to remain secured to the structure during periods of strong winds.

Figure 13:
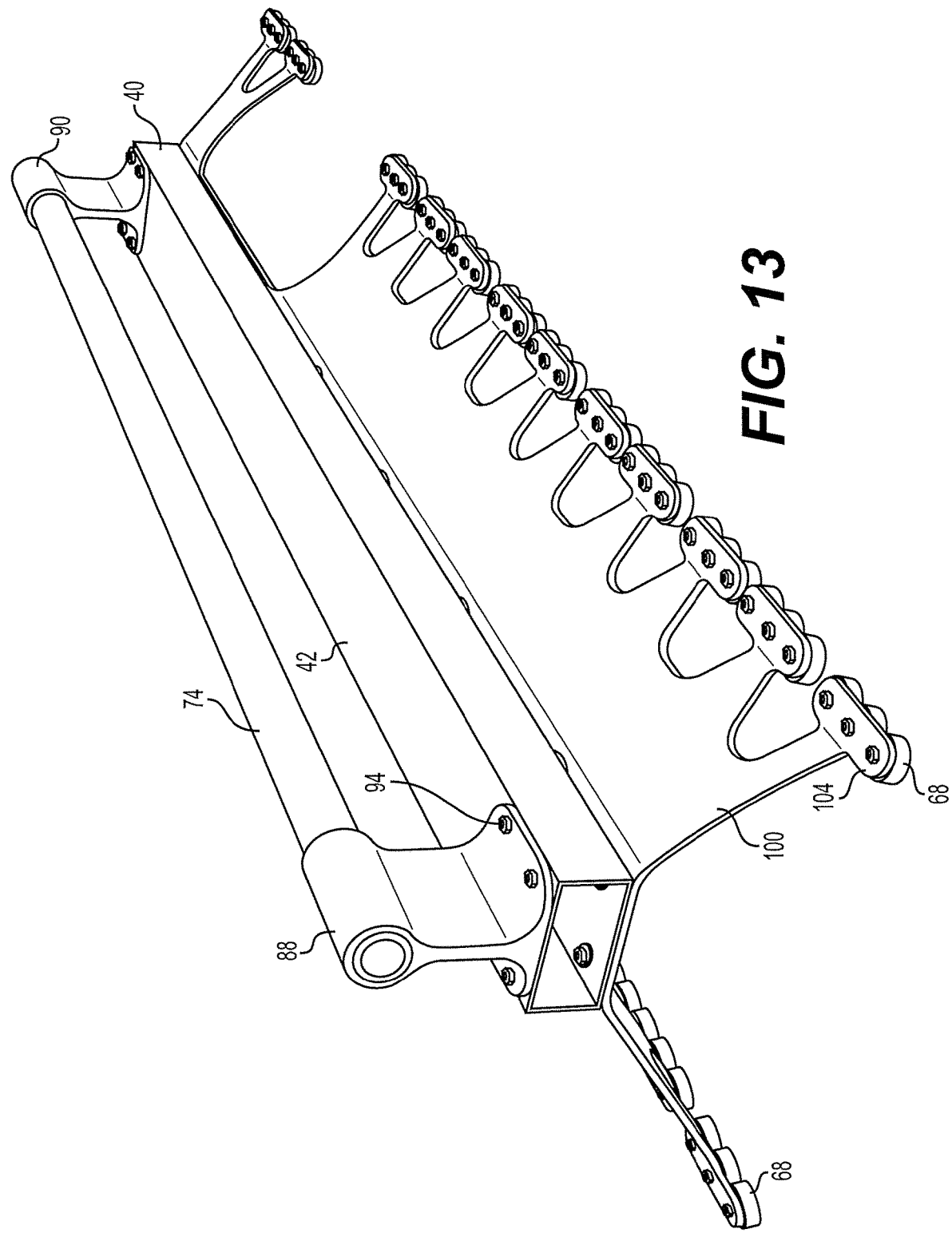
FIG. 13 is a perspective view of an embodiment of the bracket.

FIG. 12 also reveals an embodiment of the tube member 74 secured to the upper surface 42 of the box tube 40. The tube member, as with the previous embodiment, is preferably secured to the box tube 40 with mounting hardware comprising threaded fasteners 76 sunk into the upper surface 42 of the box tube 40 and the use of upper and lower jaw clamps 78, 80 to bite into and hold the tube member 74. The threaded fasteners 76 pass through and are secured to the upper surface 42 with the assistance of locking nuts 82, 84. An alternative embodiment for the tube member is shown in FIG. 13. Two tube locks 88, 90 are secured to the upper surface 42 and opposite ends of the box tube 40 and maintain the tube member 74 in position atop the box tube 40. The tube locks 88, 90 are each preferably secured to the box tube 40 with threaded fasteners 94 preventing movement of the tube member 74.

Figure 14:
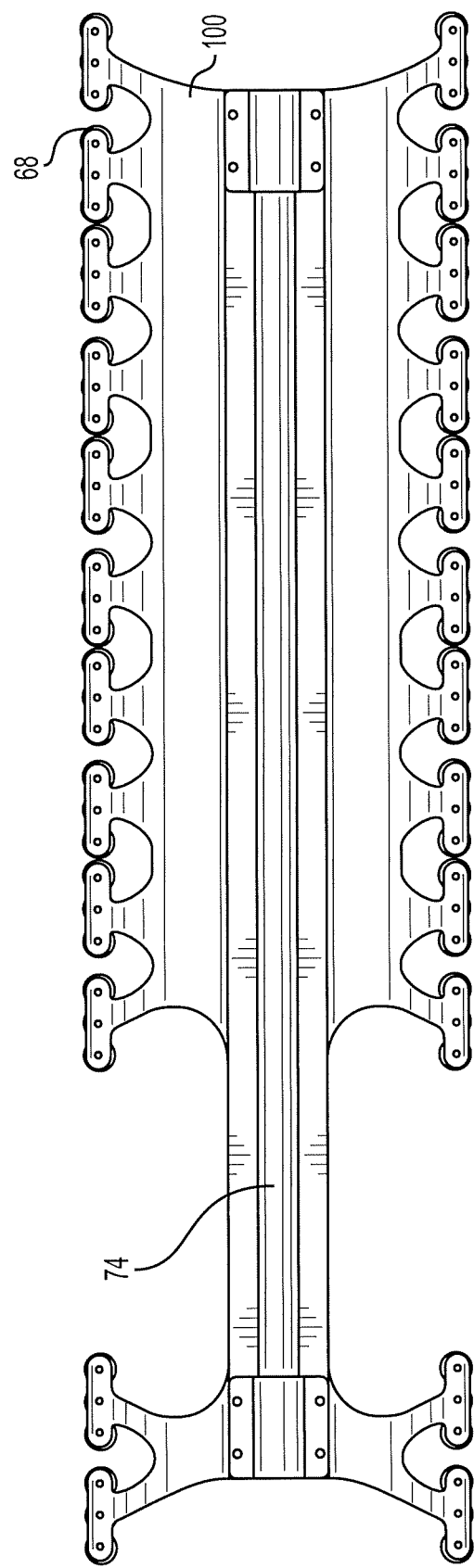
FIG. 14 is a plan view of an embodiment of the bracket.

FIG. 14 provides a plan view of the top of a bracket 10 detailing the arrangement of the leg set 100. The configuration shown in FIG. 14 is exemplary and the number and size of the magnetic pads 68 may vary substantially in number depending upon the size and weight of the hardware to be attached to the bracket 10. Considerably fewer distal elements 104 and magnetic pads 68 may be employed if the hardware is lighter and is less likely to produce wind induced loads.

Figure 15:
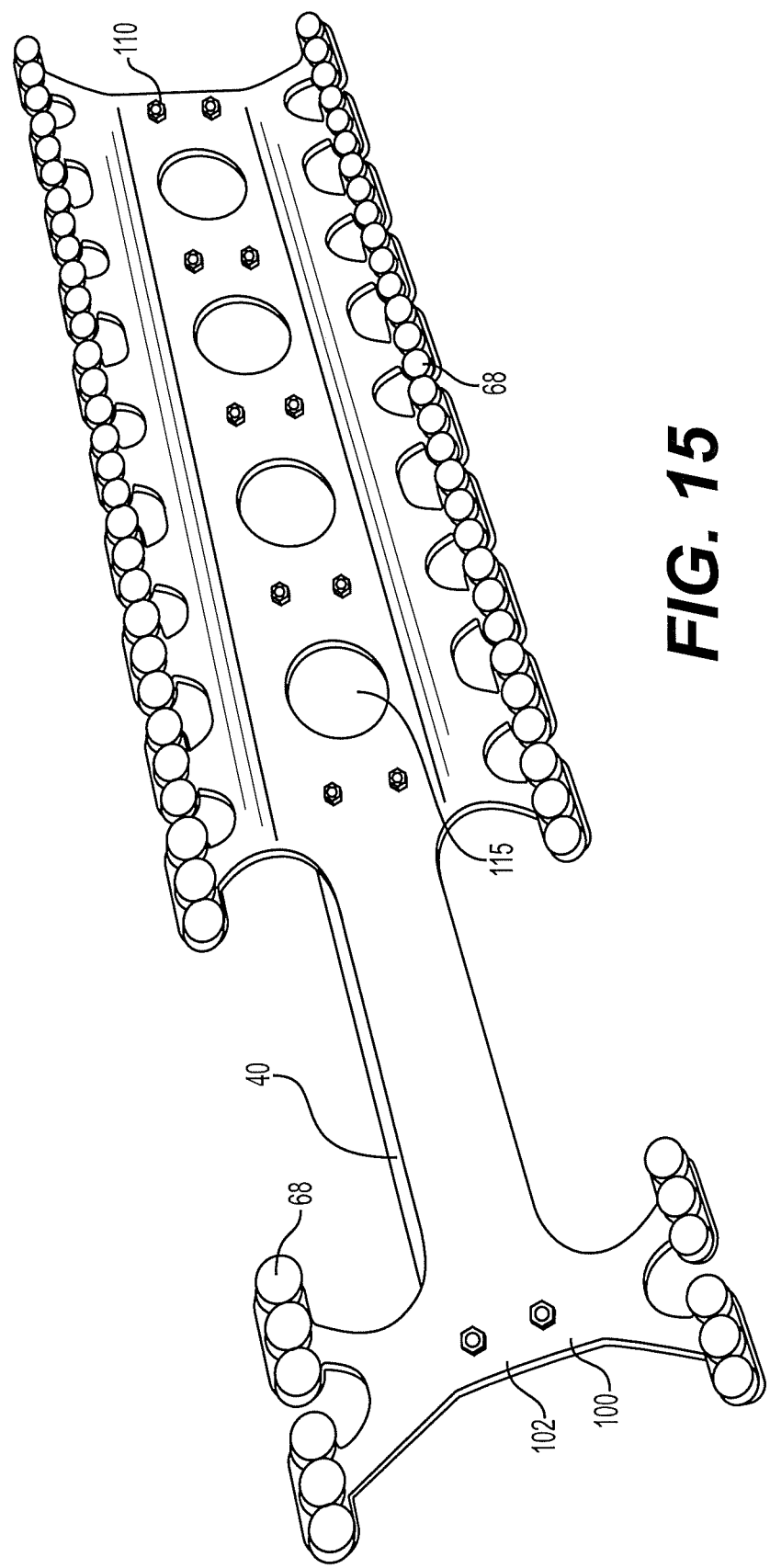
FIG. 15 is a perspective view of the bottom surface of an embodiment of the bracket.

FIG. 15 reveals the underside of the bracket 10 revealing the fasteners 110 used to secure the box tube 40 to the monolithic leg set 100. In order to reduce the weight of the bracket 10, cutouts 115 may be fabricated into the flat central panel 102. These cutouts 115 will not adversely impact the rigidity of the bracket 10 and can result in a weight savings that translates into an installation process that is less physically demanding for the installer.

In operation, an installer positions the bracket 10 in proximity to the area of the structure for attachment purposes. Once the bracket 10 moves into close proximity to the ferromagnetic surface the plurality of magnetic pads 68 will draw the bracket into contact with the structure. This process may be accomplished, for example, by standing on a catwalk 120, as shown in FIG. 1, and positioning the bracket 10 onto the surface 24 of the structure 26. The brackets 10 disclosed herein are not limited to vertically oriented surfaces such as the surface of the shell of a water tower or the leg of a water tower, but also be utilized on a horizontal surface such as beneath the catwalk 120 shown in FIG. 1. The substantial holding power of the magnetic pads 94 allows the application of the brackets 10 to ferromagnetic surfaces in essentially any orientation.

Hardware 20, such as the directional antenna 22 shown in FIGS. 1, 2, 10 and 11, are secured to the tube member 74 with attachment components that are appropriate for the specific application. Mechanical means for fastening an antenna or other types of hardware 20, to the bracket 10 are diverse and well known in the industry. FIG. 4 details an exemplary configuration wherein the mast 130 of the directional antenna as well as the fastening plates 132, threaded fasteners 134, 136 and ring bands 138, 140 secure the antenna mast 130 to the tube member 74 of the bracket 10 while the bracket 10 is magnetically secured to the surface of the structure.

The various types of hardware 20 that may be secured to the tube member 74 include, for example, a satellite dish, a directional antenna, a stick antenna, a cellular panel, a banner for advertising purposes, lighting, cable trays, lighting fixtures and rigging for maintenance purposes. The aforementioned list is not fully inclusive, but only exemplary, as other bracket applications may exist that are not listed. Once the hardware 20 is secured to the tube member 74 with the appropriate attachment hardware, the orientation of the hardware, such as a directional antenna 22 may be adjusted without concern that movement of the hardware will cause the bracket 10 to disconnect from the surface of the structure. In addition, and as shown in FIG. 4, the cabling 140 extending away from the hardware 20 may be secured to the tube member 74 with zip ties 145 or any other appropriate attachment means.

Figure 16:
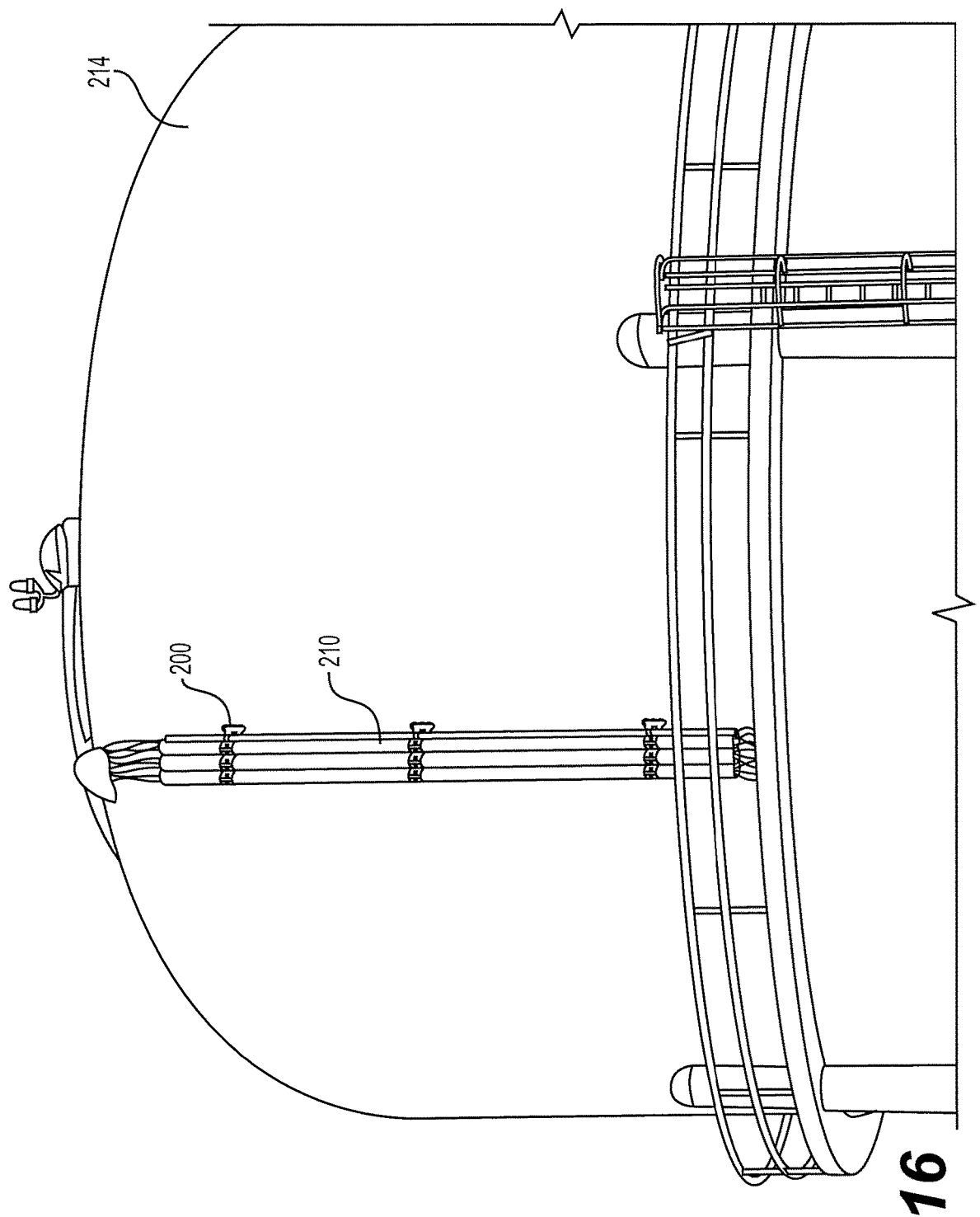
FIG. 16 is a perspective view of an embodiment of the bracket secured to the surface of a water tower structure.
Figure 17:
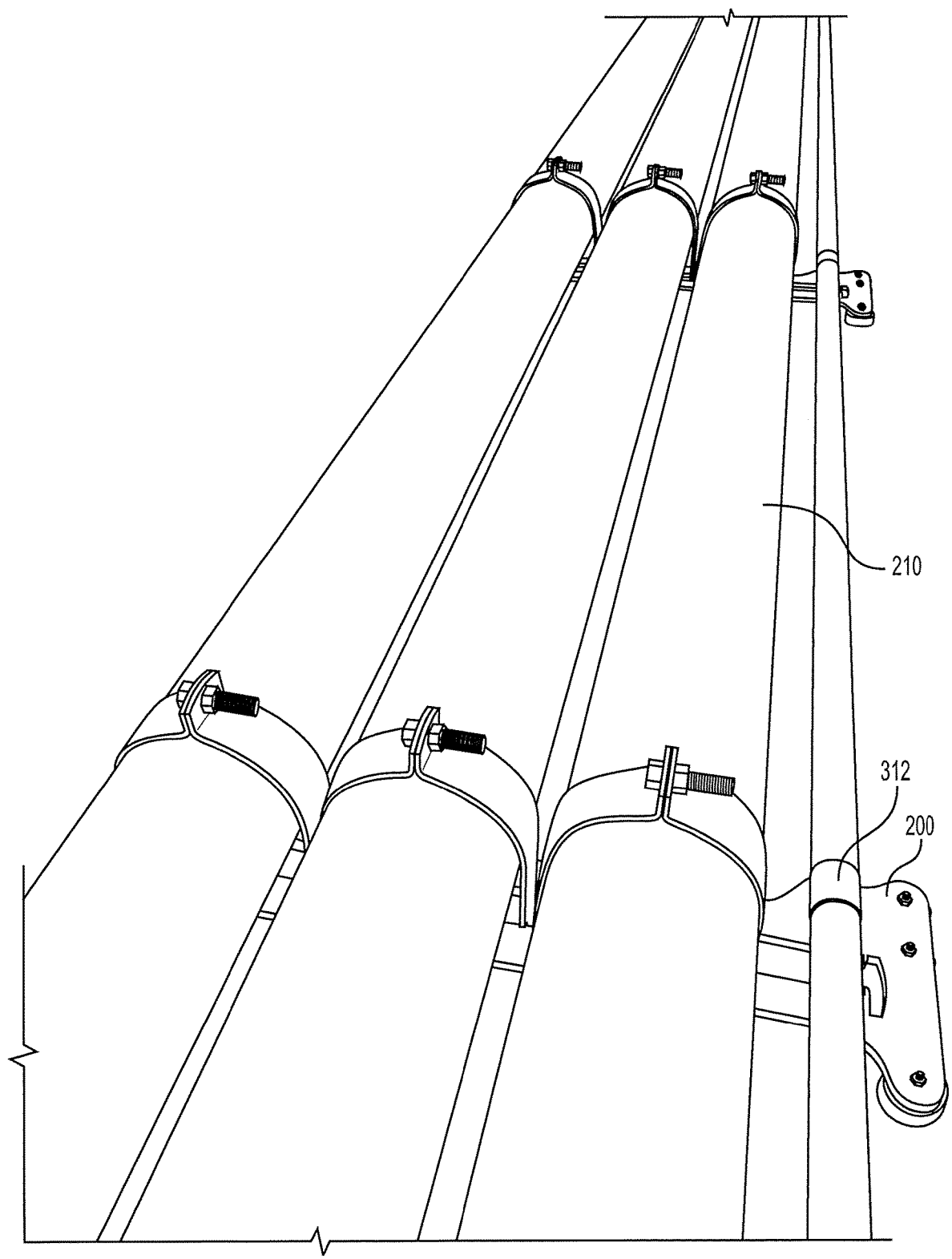
FIG. 17 is a perspective view of an embodiment of the bracket securing conduit runs in position on a structure.
Figure 18:
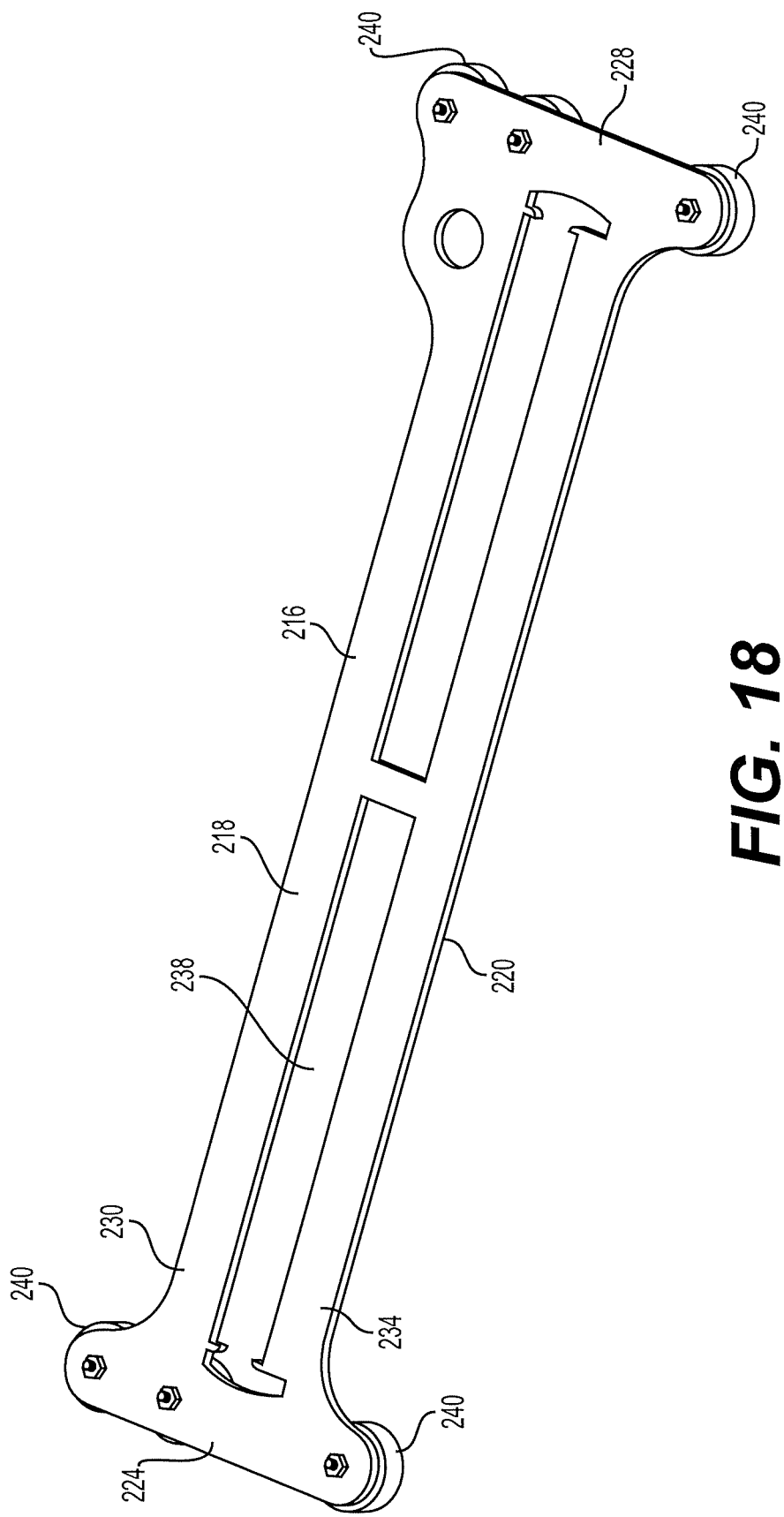
FIG. 18 is a perspective view of an embodiment of a bracket panel member.
Figure 19:
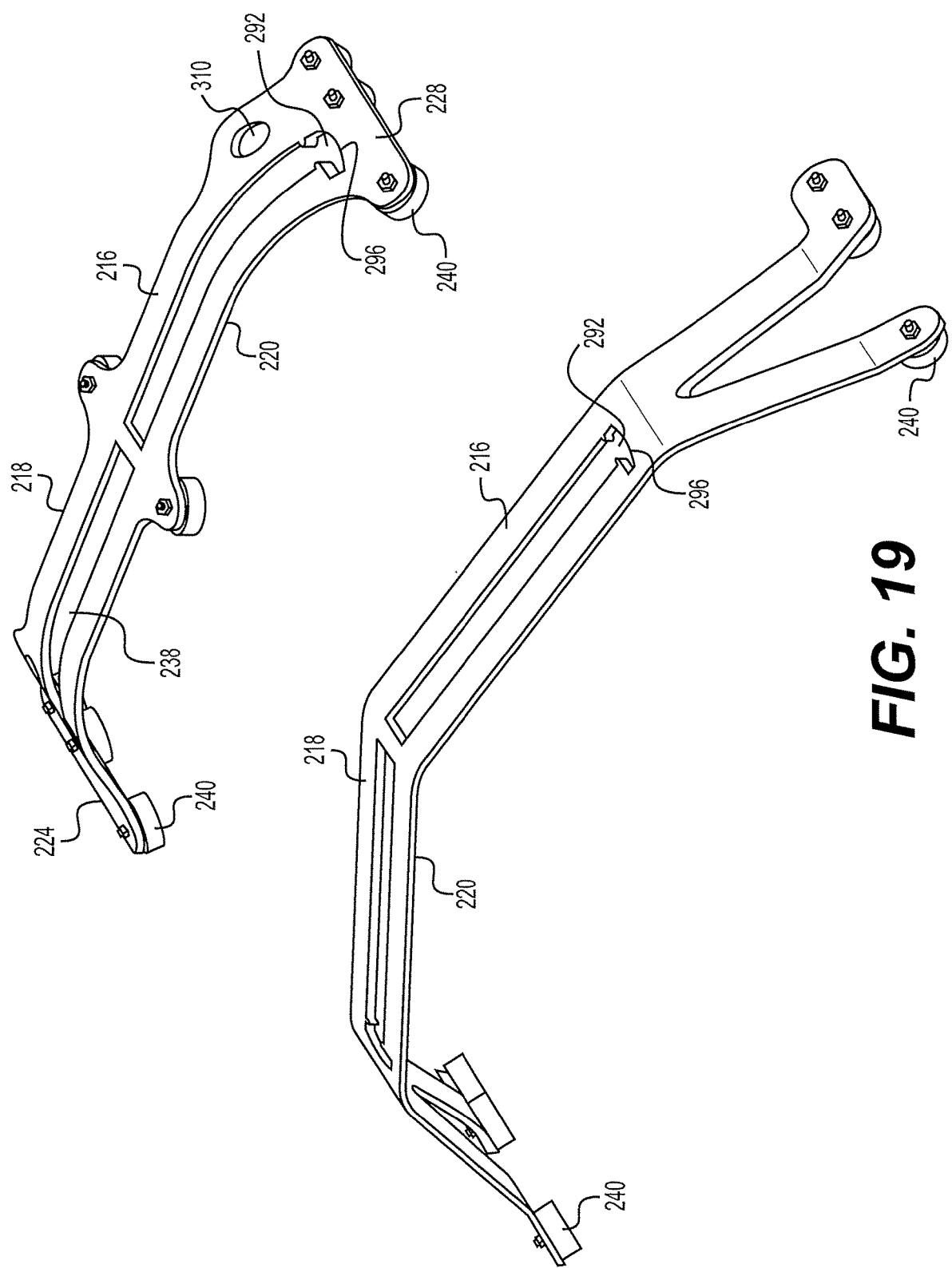
FIG. 19 is a perspective view of an embodiment of two bracket panel members bent to conform to the topography of the surfaces of structures.

FIG. 16 details an additional embodiment of a bracket apparatus 200 for magnetically securing hardware, typically conduit 210, to a surface 212 of a structure 214. FIG. 17 provides a view of the conduit 210 traversing over the bracket apparatus 200 and secured in position with clamps around each of the conduit members 210. The bracket apparatus 200 comprises, as shown in FIG. 18, a longitudinally extending panel member 216 with an upper surface 218 and a lower surface 220, oppositely disposed ends 224, 228, first and second rail members 230, 234 and at least one longitudinally extending channel 238 between the rail members 230, 234. The bracket 200 utilizes at least one magnetic pad 240 mounted to each of the oppositely disposed panel ends 224, 228. The panel member 216 is preferably fabricated from 10 gauge stainless or galvanized steel. The channel 238 and rails 230, 234 may be of varying dimensions to accommodate hardware 242, such as conduit, and the panel 216 may be bent, as seen in FIG. 19, in a wide range of configurations to accommodate the topography of the structure 214 to which the bracket 200 is magnetically attached.

Figure 20:
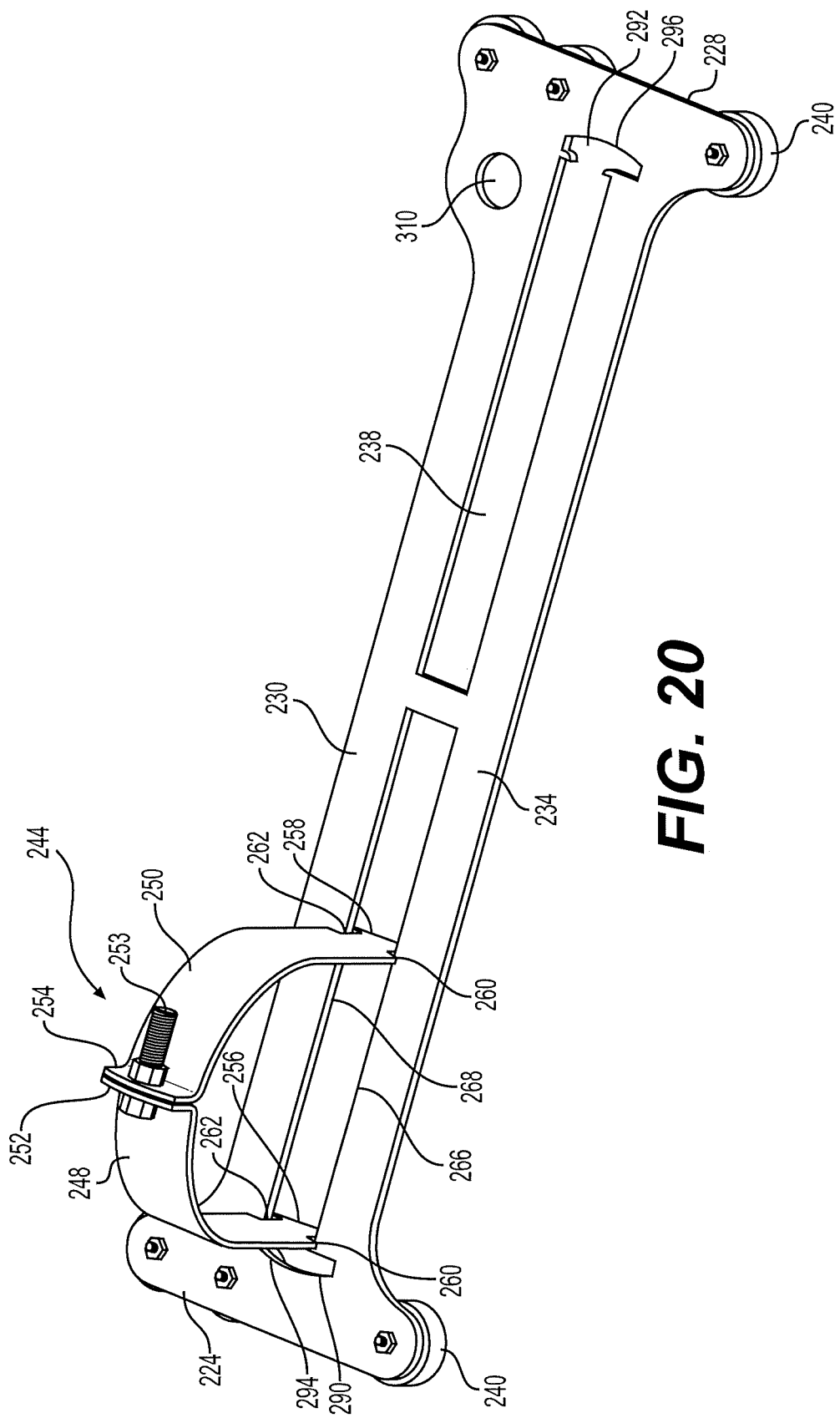
FIG. 20 is a perspective view of an embodiment of a bracket with a clamp set in position.

FIG. 20 reveals a clamp set 244 used in combination with the bracket 200. The clamp set includes first and second clamp members 248, 250 with each clamp member having an upper end 252, 254 and a lower end 256, 258. The upper end 252 of the first clamp member 248 is secured to the upper end 254 of the second clamp member 250, with a fastener 253. The lower ends 256, 258 of the first and second clamp members 248, 250 include slots 260, 262 proximate the lower ends 256, 258. In operation, the clamp members 248, 250 are rotated to allow the lower ends 256, 258 to pass through the channel 238 and drop below the rail members 230, 234. Once the slots 260, 262 are at a level consistent with the rail members 230, 234 then the clamp members 248, 250 are rotated to an orientation such that the clamp members 248, 250 are perpendicular with the edges 266, 268 of the rail members 230, 234. Once in this orientation, the clamp members 248, 250 are retained by the panel member 216 due to the lower edges 272, 274 of the slots 260, 262, as shown in FIG. 21, interfering with the lower surfaces 278, 280 of the rail members 230, 234 thereby preventing extraction of the clamp members 248, 250.

Figure 20A:
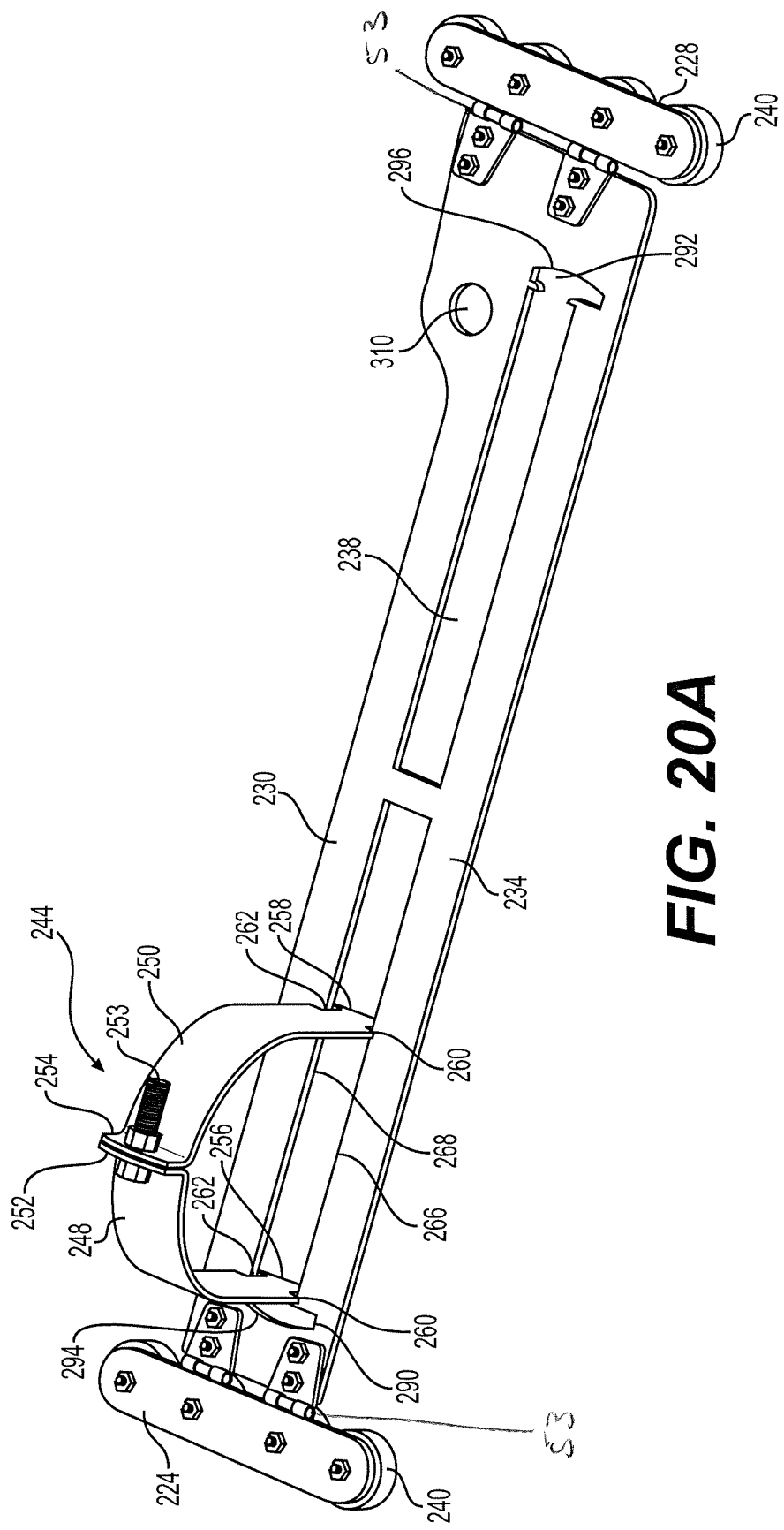
FIG. 20A is a perspective view of the embodiment of the bracket shown in FIG. 20 with a hinge element.

FIG. 20A reveals an embodiment of the bracket with hinges members 53 proximate the oppositely disposed distal ends 224, 228. The hinge members 53 facilitate increased surficial contact between the surface of the structure and the face of the magnetic pads 240 by allowing the magnetic pads 240 to rotate in order to fully engage with the surface of the structure.

As detailed in FIG. 20, the panel member 216 preferably utilizes keyway openings 290, 292 contiguous with the first and second ends 294, 296 of the longitudinally extending channel 238. The keyway openings 290, 292 facilitate utilization of the outermost clamp member 248 when conduit hardware 242 is already in position atop the panel member 216. When the outer surface of the conduit 242 extends to the first and second ends 294, 296 of the channel 238 it may not be possible to lower the lower ends 256, 258 into the channel so that the slots 260, 262 are at a level consistent with rail members 230, 234. The inability to sufficiently rotate the clamp member 248 and drop the lower end 256 into the channel 238 without rotational interference from the conduit hardware 242 is resolved by use of the keyway openings 290, 292.

Figure 21:
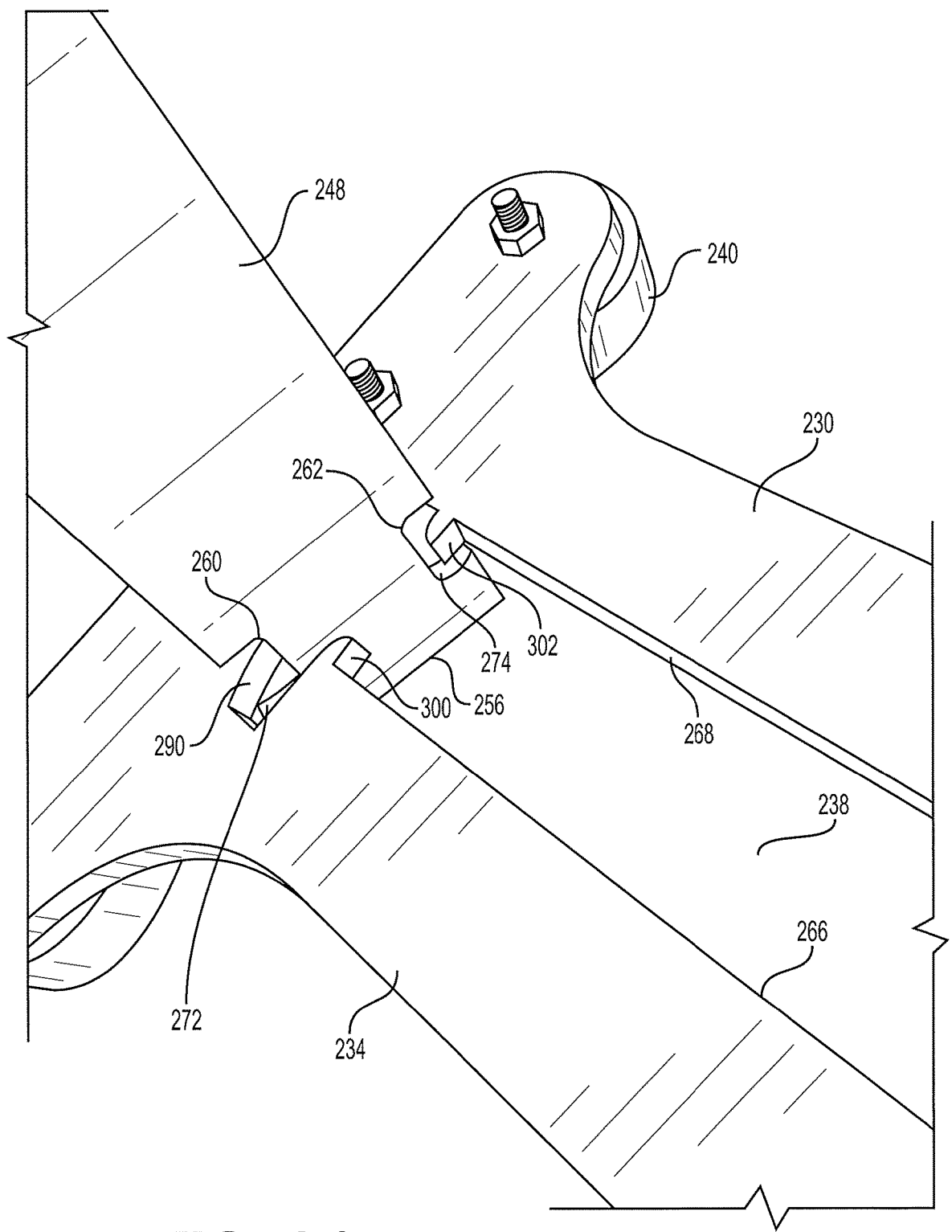
FIG. 21 is a perspective view of an embodiment of a panel member and keyway opening.

As shown in FIG. 21, insertion of the lower end 256 of the first clamp member 248 into the keyway opening 290 lessens the need to rotate the clamp member by as much as 20 degrees thereby allowing conduit 242 to extend closer to the first end 294 of the channel 238. The same procedure may also be utilized at the second end 296 of the channel 238. The keyway openings 290, 292 utilize flanges 300, 302 that serve as a boundary or hard stop between the keyway openings 290, 292 preventing the inadvertent movement of a clamp member 248, 250 positioned within the channel 238 into the keyway openings 290, 292 and possible release of the clamp member 248 and the conduit hardware 242 from the panel member 216. The keyway openings 290, 292 may be of many configurations and the one detailed in FIG. 21 is only exemplary of configurations that may be utilized.

Figure 22:
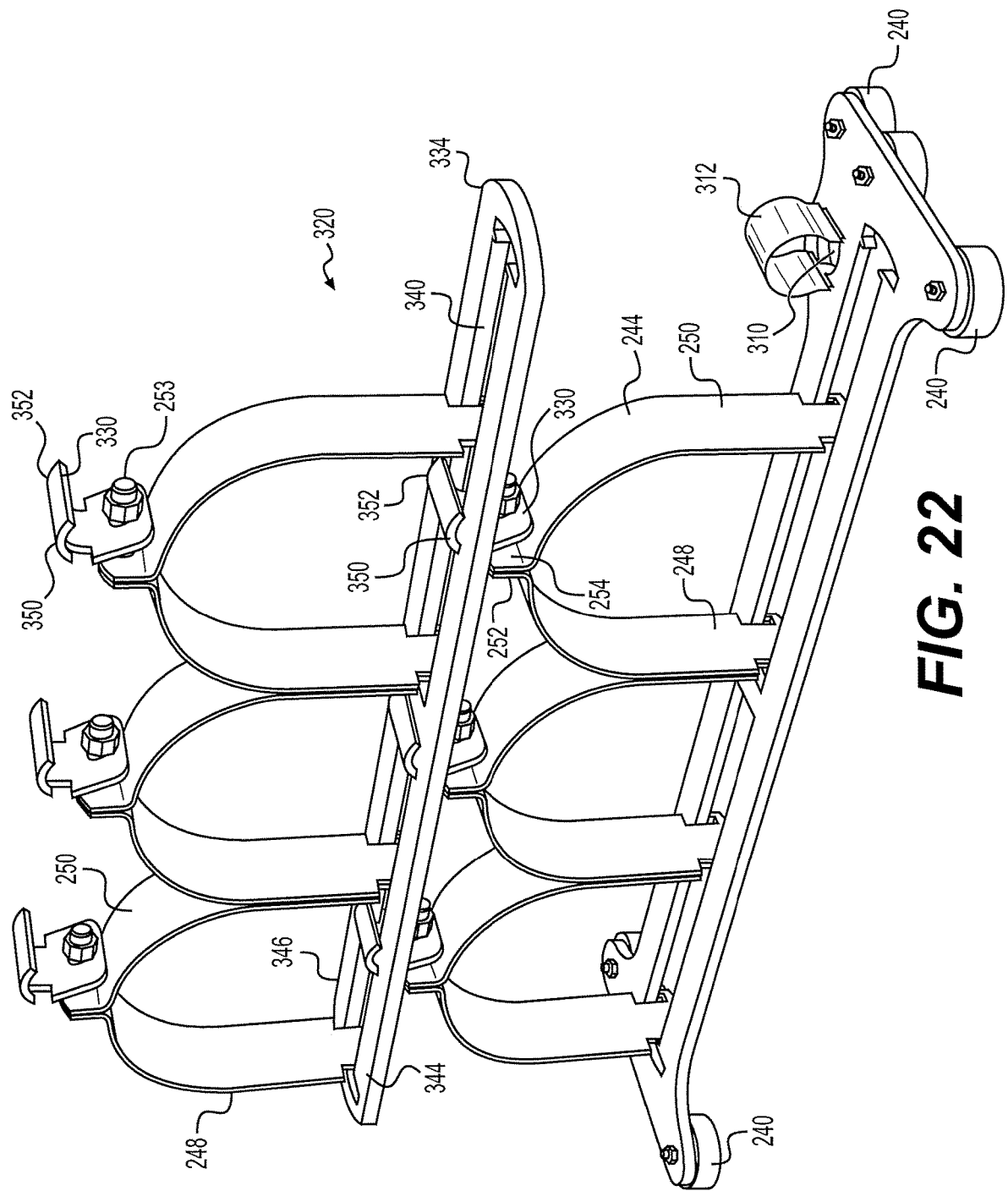
FIG. 22 is a perspective view of an embodiment of a duplexed bracket configuration.

In order to maximize the holding capacity of the bracket 200 to hold conduit or other hardware 242, the panel member 216, as seen in FIG. 20, preferably includes a cutout 310 proximate one or both of the oppositely disposed ends 224, 228, for insertion of a clip 312, as shown in FIGS. 17 and 22, into the cutout 310. The clip is preferably utilized to retain a smaller conduit adjacent larger hardware 242 retained by the clamp set 244.

For applications where space upon the surface 212 of the structure 214 for mounting the bracket apparatus 200 and associated hardware is limited, a duplex configuration 320 is shown in FIG. 22. The upper ends 252, 254 of the first and second clamp members 248, 250 of the clamp set 244 may employ mounting hardware for securing an additional longitudinally extending panel member 334 atop the first row of clamp sets.

As seen in FIG. 22, the duplex configuration utilizes "c" shaped clips 330 secured to the clamp set 244 at the upper ends 252, 254 at the area of connection between the first and second clamp members 248, 250. In use, the fastening hardware 253 securing the first and second clamp members 248, 250 to one another also secures the clip 330 to the upper panel member 334. The outwardly extending wings 350, 352 of the clip 330 interfere with and engage the rails 344, 346 of the upper panel member 334 after the clip is rotated and inserted within the channel 340 and provides a downward "bite" preventing lateral or shear movement when the clip 330 is straightened by tightening a nut onto the fastener 253, thus locking the clip 330 into a tightened configuration.

In use, the brackets 200 can be mounted to the surface 212 of the structure 214 typically in two ways. First, by positioning the magnetic pads 240 over the desired location and allowing magnetic attraction between the surface of the structure and the magnetic pads to draw the brackets to the surface 212. Once one or more brackets 200 are mounted to the structure 214. The hardware 242, typically conduit, is laid atop the panel member 216. The clamp sets 244 are then built around the conduit, as previously detailed above, by insertion of the lower ends 256, 258 of the first and second clamp members 248, 250 into the channel 238 so that the slots 260, 262 are at the same level as the rail members 230, 234. Once the slots are at the same level as the rail members, the clamp members 248, 250 can be rotated to align the upper ends 252, 254 with one another. When the upper ends are aligned a fastener 253 secures the two ends together and the conduit is secured in position such that the clamp members 248, 250 will not detach from the panel member 216. The lower edges 272, 274 of the slots 260, 262 will interfere with the lower surfaces of the rail members 218, 220 and prevent withdrawal of the clamp members 248, 250.

An alternative method of securing the hardware/conduit 242 to the structure 214 is to secure the panel member to the structure with the magnetic pads 240. The installer then proceeds to assemble one or more clamp sets 244 in place on the panel member 216. Once the clamp sets are fully assembled, as detailed above, the hardware/conduit 242 can be run through the clamp sets 244. The threaded fastener 253 located at the upper ends 252, 254 of each clamp member 248, 250 can then be tightened once the hardware 242 is properly situated against the surface 212 of the structure 214.

The various embodiments of the brackets detailed above provide a wide range of options for safely and quickly securing cabling and conduits to the exterior and interior surfaces of structures such as water towers. With some of the above detailed embodiments, the bracket legs are custom fabricated to match the radius of curvature of the structure in order to maximize the tangential surficial contact between the magnetic elements and the attachment surface.

Although the invention has been described above with reference to one or more preferred embodiments, it will be appreciated that various changes or modifications may be made without departing from the scope of the invention as defined in the appended claims.

I claim:

1. A bracket for magnetically securing hardware to a surface of a structure, the bracket comprising;
   a longitudinally extending enclosed box tube with an upper and a lower surface;
   a one-piece monolithic leg member with at least one leg per side extending outwardly proximate the lower surface of the enclosed box tube, the at least one leg per side terminating at a distal end and the distal end of each leg member is attached to the leg member with a hinge;
   at least one magnetic pad secured to the distal end of the at least one leg per side; and
   a tube member mounted to the upper surface of the enclosed box tube; wherein in a use configuration, hardware is mounted to the tube member.

2. The bracket of claim 1, wherein the hardware is at least one of 1) a satellite dish, 2) a directional antenna, 3) a stick antenna, 4) a cellular panel, 5) a banner, 6) lighting fixtures, 7) cable trays, and 8) rigging for maintenance purposes.

3. The bracket of claim 1, wherein the leg member proximate the lower surface of the box tube comprises at least one discrete support bracket.

4. The bracket of claim 3, wherein the leg member proximate the lower surface of the box tube further comprises at least two discrete support brackets.

5. The bracket of claim 1, wherein the one-piece monolithic leg member proximate the lower surface of the box tube with at least one leg per side extending outwardly comprises a monolithic support bracket member.

6. The bracket of claim 5, wherein the monolithic support member bracket further comprises at least two legs per side of the box tube.

7. The bracket of claim 1, wherein the hardware is mounted to the tube member with mounting elements.

8. The bracket of claim 1, wherein the at least one leg per side of the leg member is bent to conform to the topography of the structure.

9. The bracket of claim 7, wherein the tube member is fabricated from stainless steel.

10. A bracket for securing hardware to a structure, the bracket comprising;
    a longitudinally extending enclosed box tube with an upper and a lower surface;
    a one-piece monolithic support bracket secured to the lower surface of the box tube, the support bracket further comprising a substantially flat central panel and at least one leg extending outwardly from the central panel on both sides of the box tube, the legs terminating at distal ends, wherein a magnet is mounted to the distal ends of each leg member and the distal end is secured to the leg member with a hinge; and
    a tube member mounted to the upper surface of the enclosed box tube.

11. A bracket mounting system for magnetically securing hardware to a surface of a structure, the bracket mounting system comprising;
    a longitudinally extending enclosed box tube with an upper and a lower surface;
    a one-piece monolithic support bracket with at least one leg per side extending outwardly from proximate the lower surface of the enclosed box tube, the at least one leg per side terminating at distal ends, the at least one leg per side bendable to conform to the topography of the structure;
    at least one magnetic pad secured to the distal end of each of the at least two legs the distal ends hingedly connected to the at least two leg members; and
    a tube member mounted to the upper surface of the enclosed box tube; wherein in a use configuration, hardware is mounted to the tube member.

12. The bracket mounting system of claim 11, wherein the hardware is at least one of 1) a satellite dish, 2) a directional antenna, 3) a stick antenna, 4) a cellular panel, 5) a banner with lettering or images, 6) lighting, 7) cabling, and 8) rigging for maintenance purposes.

13. The bracket mounting system of claim 11, wherein the at least one leg per side extending outwardly from proximate the lower surface of the box tube comprises at least one support bracket mounted to the lower surface of the box tube.

14. The bracket mounting system of claim 13, wherein the at least one support bracket comprises two separate support brackets mounted to the lower surface of the box tube.

15. The bracket mounting system of claim 11, wherein the at least one leg per side extending outwardly from proximate the lower surface of the box tube comprises a monolithic support bracket member secured to the lower surface of the box tube.

* * * * *